(12) United States Patent
Fujimoto

(10) Patent No.: US 8,908,273 B2
(45) Date of Patent: *Dec. 9, 2014

(54) IMAGING LENS, OPTICAL APPARATUS EQUIPPED THEREWITH AND METHOD FOR MANUFACTURING IMAGING LENS

(75) Inventor: Makoto Fujimoto, Tokyo (JP)

(73) Assignee: Nikon Corporation, Tokyo (JP)

( * ) Notice: Subject to any disclaimer, the term of this patent is extended or adjusted under 35 U.S.C. 154(b) by 311 days.

This patent is subject to a terminal disclaimer.

(21) Appl. No.: 13/237,911

(22) Filed: Sep. 20, 2011

(65) Prior Publication Data

US 2012/0069441 A1 Mar. 22, 2012

(30) Foreign Application Priority Data

Sep. 21, 2010 (JP) ................................ 2010-210833
May 30, 2011 (JP) ................................ 2011-120468

(51) Int. Cl.
*G02B 27/64* (2006.01)
*G02B 15/14* (2006.01)
*G02B 15/177* (2006.01)
*G02B 27/00* (2006.01)

(52) U.S. Cl.
CPC .......... *G02B 15/177* (2013.01); *G02B 27/0018* (2013.01); *G02B 27/646* (2013.01)
USPC ............ 359/557; 359/676; 359/686; 359/691

(58) Field of Classification Search
CPC ............ G02B 9/00; G02B 9/04; G02B 13/00; G02B 13/003; G02B 15/00; G02B 15/14; G02B 15/161; G02B 27/64; G02B 27/646
USPC ................... 359/672, 675, 676–692, 554–557
See application file for complete search history.

(56) References Cited

U.S. PATENT DOCUMENTS

| | | | | |
|---|---|---|---|---|
| 4,591,235 A | * | 5/1986 | Tokumaru et al. ............ | 359/686 |
| 5,490,014 A | * | 2/1996 | Suzuki ......................... | 359/745 |
| 5,774,267 A | | 6/1998 | Kodama et al. | |
| 5,835,272 A | * | 11/1998 | Kodama ....................... | 359/557 |
| 5,841,588 A | * | 11/1998 | Suzuki et al. ................. | 359/683 |
| 5,847,875 A | | 12/1998 | Kodama et al. | |
| 6,320,698 B1 | * | 11/2001 | Suzuki ......................... | 359/557 |
| 6,618,198 B1 | | 9/2003 | Endo | |
| 7,489,449 B2 | * | 2/2009 | Kawana ....................... | 359/680 |
| 8,199,411 B2 | * | 6/2012 | Fujimoto ...................... | 359/680 |

(Continued)

FOREIGN PATENT DOCUMENTS

| JP | 07-152002 A | 6/1995 |
|---|---|---|
| JP | 09-113808 A | 5/1997 |

(Continued)

*Primary Examiner* — Thong Nguyen

(74) *Attorney, Agent, or Firm* — Miles & Stockbridge P.C.

(57) ABSTRACT

An imaging lens, an optical apparatus equipped therewith, and a method for manufacturing the imaging lens are provided. The imaging lens includes a front lens group having negative refractive power disposed to the most object side and a rear lens group having negative refractive power, disposed to an image side of the front lens group and moving at least a portion thereof in a direction including a component substantially perpendicular to an optical axis. The rear lens group includes G3a having negative refractive power, G3b having negative refractive power, and G3c having positive refractive power. G3b is disposed between G3a and G3c. G3b side lens surface of G3a is a concave surface facing G3b. G3b is a negative meniscus lens shape having a concave surface facing G3a. At least one lens surface among optical surfaces of G3a, G3b and G3c is an aspherical surface.

13 Claims, 25 Drawing Sheets

(56) References Cited

U.S. PATENT DOCUMENTS

2010/0238560 A1 9/2010 Fujimoto

FOREIGN PATENT DOCUMENTS

| | | |
|---|---|---|
| JP | 09-230242 A | 9/1997 |
| JP | 11-174329 A | 7/1999 |
| JP | 11-231220 A | 8/1999 |
| JP | 2000-356704 A | 12/2000 |
| JP | 2002-048974 A | 2/2002 |
| JP | 2004-061910 A | 2/2004 |
| JP | 2005-283695 A | 10/2005 |
| JP | 2008-233585 A | 10/2008 |
| JP | 2010-217535 A | 9/2010 |

* cited by examiner

COMA UPON VR

COMA UPON VR

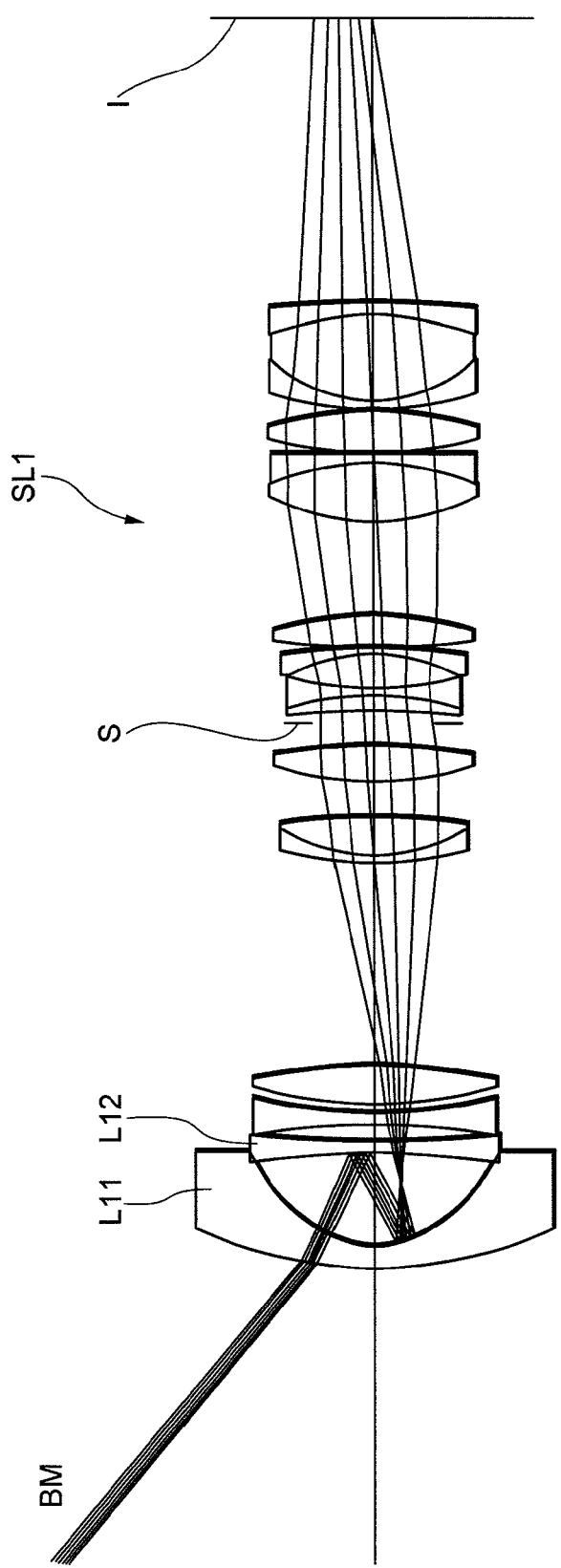

COMA UPON VR

IMAGING LENS, OPTICAL APPARATUS EQUIPPED THEREWITH AND METHOD FOR MANUFACTURING IMAGING LENS

The disclosure of the following priority applications are herein incorporated by reference:

Japanese Patent Application No. 2010-210833 filed on Sep. 21, 2010, and

Japanese Patent Application No. 2011-120468 filed on May 30, 2011.

BACKGROUND ART

1. Field of the Invention

The present invention relates to an imaging lens, an optical apparatus equipped with the imaging lens and a method for manufacturing the imaging lens.

2. Related Background Art

A zoom lens having a first lens group with negative refractive power suitable for wide-angle photography and having a vibration reduction function has been proposed, for example, Japanese Patent Application Laid-Open No. 7-152002.

With making a third lens group having negative refractive power as a vibration reduction lens group, the zoom lens has excellent vibration reduction performance. Moreover, in recent years, increased strictness about ghost images and flare defined as one of factors, which affect not only aberration correction performance but also optical performance, has been requested to such a zoom lens. Therefore, a request for the higher performance is given also to an antireflection coating formed on a lens surface, and a multi-layered film design technique and a multi-layered film forming technique continue their developments (refer to, e.g., Japanese Patent Application Laid-Open No. 2000-356704).

However, in such a zoom lens, an imaging lens having higher optical performance capable of taking a wide-angle photograph has been requested. In particular, higher optical performance has been requested to a large aperture, wide-angle zoom lens. Moreover, there has been a problem that optical surfaces of such a zoom lens tend to generate reflection light producing ghost images and flare.

SUMMARY OF THE INVENTION

The present invention is made in view of the above-described problems, and has an object to provide an imaging lens having high optical performance with excellently reducing ghost images and flare, an optical apparatus equipped with the imaging lens and a method for manufacturing the imaging lens.

According to a first aspect of the present invention, there is provided an imaging lens comprising: a front lens group having negative refractive power disposed to the most object side; and a rear lens group having negative refractive power, disposed to an image side of the front lens group and moving at least a portion thereof in a direction including a component substantially perpendicular to an optical axis, the rear lens group including a first negative lens component having negative refractive power, a second negative lens component having negative refractive power, and a positive lens component having positive refractive power, the second negative lens component being disposed between the first negative lens component and the positive lens component, the second negative lens component side lens surface of the first negative lens component being a concave surface facing the second negative lens component, the second negative lens component being a negative meniscus lens shape having a concave surface facing the first negative lens component, and at least one lens surface among optical surfaces of the first negative lens component, the second negative lens component and the positive lens component being an aspherical surface.

According to a second aspect of the present invention, there is provided an optical apparatus equipped with the imaging lens for forming an image of an object on a given image plane according to the first aspect.

According to a third aspect of the present invention, there is provided a method for manufacturing an imaging lens including a front lens group having negative refractive power and a rear lens group having negative refractive power, the method comprising steps of: disposing the front lens group to the most object side; disposing the rear lens group to an image side of the front lens group; disposing a first negative lens component having negative refractive power, a second negative lens component having negative refractive power and a positive lens component having positive refractive power such that the second negative lens component is disposed between the first negative lens component and the positive lens component, and a shape of an air lens formed by the first negative lens component and the second negative lens component is a double convex shape; disposing an aspherical surface on at least one lens surface among optical surfaces of the first negative lens component, the second negative lens component and the positive lens component; and disposing at least a portion of the rear lens group movably in a direction including a component substantially perpendicular to the optical axis.

The present invention makes it possible to provides an imaging lens having high optical performance with excellently reducing ghost images and flare, an optical apparatus equipped with the imaging lens and a method for manufacturing the imaging lens.

BRIEF DESCRIPTION OF THE DRAWINGS

FIGS. 2A and 2B are graphs of various aberrations of the imaging lens according to Example 1 in a wide-angle end state upon focusing on infinity, in which FIG. 2A shows various aberrations without vibration reduction, and FIG. 2B shows coma upon vibration reduction.

FIGS. 3A and 3B are graphs of various aberrations of the imaging lens according to Example 1 in an intermediate focal length state upon focusing on infinity, in which FIG. 3A shows various aberrations without vibration reduction, and FIG. 3B shows coma upon vibration reduction.

FIGS. 4A and 4B are graphs of various aberrations of the imaging lens according to Example 1 in a telephoto end state upon focusing on infinity, in which FIG. 4A shows various aberrations without vibration reduction, and FIG. 4B shows coma upon vibration reduction.

FIG. 5 is a sectional view showing the configuration of the imaging lens seen from another point of view according to Example 1 of the present application, illustrating one example of how incident light beams are reflected by a first-ghost-image-generating surface and a second-ghost-image-generating surface.

FIGS. 7A and 7B are graphs of various aberrations of the imaging lens according to Example 2 in a wide-angle end state upon focusing on infinity, in which FIG. 7A shows various aberrations without vibration reduction, and FIG. 7B shows coma upon vibration reduction.

FIGS. 8A and 8B are graphs of various aberrations of the imaging lens according to Example 2 in an intermediate focal length state upon focusing on infinity, in which FIG. 8A shows various aberrations without vibration reduction, and FIG. 8B shows coma upon vibration reduction.

FIGS. 9A and 9B are graphs of various aberrations of the imaging lens according to Example 2 in a telephoto end state upon focusing on infinity, in which FIG. 9A shows various aberrations without vibration reduction, and FIG. 9B shows coma upon vibration reduction.

FIGS. 11A and 11B are graphs of various aberrations of the imaging lens according to Example 3 in a wide-angle end state upon focusing on infinity, in which FIG. 11A shows various aberrations without vibration reduction, and FIG. 11B shows coma upon vibration reduction.

FIGS. 12A and 12B are graphs of various aberrations of the imaging lens according to Example 3 in an intermediate focal length state upon focusing on infinity, in which FIG. 12A shows various aberrations without vibration reduction, and FIG. 12B shows coma upon vibration reduction.

FIGS. 13A and 13B are graphs of various aberrations of the imaging lens according to Example 3 in a telephoto end state upon focusing on infinity, in which FIG. 13A shows various aberrations without vibration reduction, and FIG. 13B shows coma upon vibration reduction.

FIGS. 15A and 15B are graphs of various aberrations of the imaging lens according to Example 4 in a wide-angle end state upon focusing on infinity, in which FIG. 15A shows various aberrations without vibration reduction, and FIG. 15B shows coma upon vibration reduction.

FIGS. 16A and 16B are graphs of various aberrations of the imaging lens according to Example 4 in an intermediate focal length state upon focusing on infinity, in which FIG. 16A shows various aberrations without vibration reduction, and FIG. 16B shows coma upon vibration reduction.

FIGS. 17A and 17B are graphs of various aberrations of the imaging lens according to Example 4 in a telephoto end state upon focusing on infinity, in which FIG. 17A shows various aberrations without vibration reduction, and FIG. 17B shows coma upon vibration reduction.

DESCRIPTION OF THE EMBODIMENTS

Figure 1:
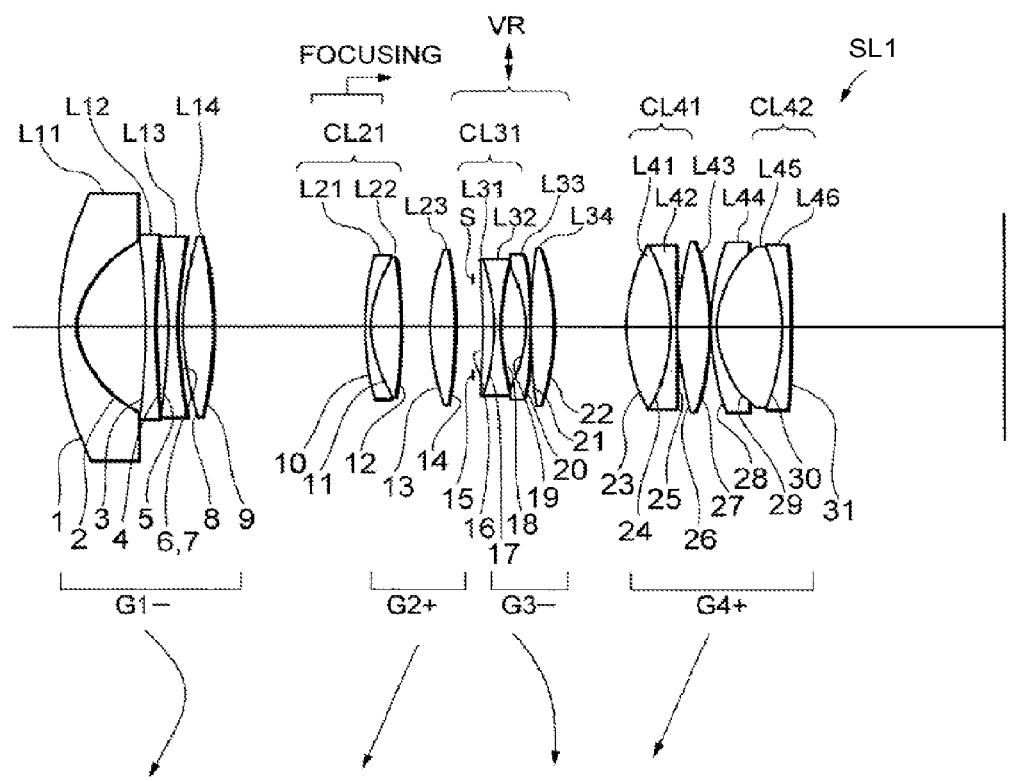
FIG. 1 is a sectional view showing a lens configuration of an imaging lens according to Example 1 of the present application.

An imaging lens according to an embodiment of the present invention will be described below with reference to accompanying drawings. As shown in FIG. 1, an imaging lens according to the present embodiment includes, in order from an object side, a first lens group as a front lens group having negative refractive power, a second lens group having positive refractive power, a third lens group as a rear lens group having negative refractive power, and a fourth lens group having positive refractive power. Upon varying a focal length (zooming) from a wide-angle end state, which gives the shortest focal length, to a telephoto end state, which gives the longest focal length, each lens group are moved along an optical axis such that a distance between the first lens group and the second lens group decreases, a distance between the second lens group and the third lens group increases, and a distance between the third lens group and the fourth lens group decreases. With this configuration, an imaging lens according to the present embodiment makes it possible to realize a wide angle of view and excellent vibration reduction performance, so that excellent optical performance can be obtained.

In an imaging lens according to the present embodiment, at least a portion or the whole of the rear group is made to be a vibration reduction lens group which is moved in a direction including a component substantially perpendicular to the optical axis. Generally, in a negative-leading zoom lens whose front lens group has negative refractive power, the front lens group is the largest lens group, and the front lens group may be moved to the object side upon focusing. Accordingly, when the front lens group is made to be a vibration reduction lens group, a holding mechanism and a driving mechanism become large and complicated, so that it is undesirable. Moreover, when a lens group, other than the front lens group and the rear group, having a large moving amount along the optical axis upon zooming is made to be the vibration reduction lens group, a holding mechanism and a driving mechanism become large and complicated, so that it is undesirable. In particular, a lens group having positive refractive power disposed between the front lens group and the rear group tends to generate decentering aberration. Accordingly, when a portion or the whole of the lens group is made to be the vibration reduction lens group, it becomes difficult to realize high vibration reduction performance, so that it is undesirable. The lens diameter of the rear group can be made relatively small, and a moving amount along the optical axis of the rear group upon zooming can be small with respect to that of any other lens group. Moreover, the rear group may be fixed upon zooming. Since the rear group generates smallest amount of decentering aberration among lens groups in the imaging lens, the rear group is suitable for the vibration reduction lens group.

With composing the rear lens group which is the vibration reduction lens group as shown below in addition to the above described configuration, an imaging lens according to the present embodiment makes it possible to realize excellent vibration reduction performance in spite of a large aperture and a super wide angle of view. An imaging lens according to the present embodiment preferably includes an aperture stop in the vicinity of the rear lens group. The rear lens group is preferably composed of, in order from the aperture stop side, a first negative lens component having negative refractive power, a second negative lens component having negative refractive power, and a positive lens component having positive refractive power. Moreover, the second negative lens component side lens surface of the first negative lens component is preferably a concave surface facing the second negative lens component. The second negative lens component is preferably a negative meniscus shape having a concave surface facing the first negative lens component. At least one lens surface among lens surfaces of the first negative lens component, the second negative lens component and the positive lens component is preferably an aspherical surface. With this configuration, it becomes possible to prevent a lens group disposed to the image side of the rear lens group from getting large. With constructing the first negative lens component, the second negative lens component and the positive lens component as a vibration reduction lens group, it becomes possible to minimize decentering coma and partial blurring (asymmetric sharpness) in the meridional image plane and the sagittal image plane generated upon shifting the vibration reduction lens group in a direction including a component substantially perpendicular to the optical axis. Incidentally, the vibration reduction lens group may be constructed by the first negative lens component and the second negative lens component, and a position of the positive lens component may be fixed in a direction substantially perpendicular to the optical axis upon vibration reduction.

At least one lens surface among lens surfaces composing the first negative lens component, the second negative lens component and the positive lens component, which form the vibration reduction lens group is an aspherical surface. With this configuration, it becomes possible to minimize spherical aberration generated upon widening the aperture ratio (faster than f/2.8) and decentering coma and partial blurring (asymmetric sharpness) in the meridional image plane and the sagittal image plane generated upon shifting the vibration reduction lens group in a direction including a component substantially perpendicular to the optical axis.

Moreover, with having positive refractive power, the positive lens component has an effect of downsizing the outer diameter of a lens group disposed to the image side of the rear lens group. Furthermore, the positive lens component is preferably a single lens having a double convex shape. With this configuration, it becomes possible to minimize decentering coma and partial blurring in the meridional image plane and the sagittal image plane generated upon shifting the vibration reduction lens group in a direction including a component substantially perpendicular to the optical axis.

When each of the first negative lens component, the second negative lens component and the positive lens component is constructed by a single lens, chromatic difference in curvature of field in the telephoto end state tends to be generated. When glass materials having low dispersion are chosen as lens mediums, chromatic difference in curvature of field can be suppressed to a certain extent. However, the refractive index of glass material decreases resulting in trade-off relation with decentering coma. Accordingly, in an imaging lens according to the present embodiment, at least one of the first negative lens component, the second negative lens component and the positive lens component is preferably a cemented lens constructed by a negative lens cemented with a positive lens. With this configuration, it becomes possible to excellently correct chromatic difference in curvature of field in the telephoto end state. Although two or more of these lens components may be cemented lenses, for the purpose of saving weight, each lens component other than the cemented lens is preferably a single lens.

In an imaging lens according to the present embodiment, when one lens component is made to be a cemented lens, the cemented surface of the cemented lens is preferably a concave surface facing the aperture stop. With this configuration, it becomes possible to excellently suppress generation of chromatic difference in curvature of field upon shifting the vibration reduction lens group in a direction including a component substantially perpendicular to the optical axis.

In an imaging lens according to the present embodiment, although the rear lens group is composed of the first negative lens component, the second negative lens component and the positive lens component, another lens component may be added outside adjacent to the first negative lens component or the positive lens component.

In an imaging lens according to the present embodiment, the following conditional expression (1) is preferably satisfied:

$$|r2|<|r1| \qquad (1)$$

where r1 denotes a radius of curvature of the second-negative-lens-component side lens surface of the first negative lens component, and r2 denotes a radius of curvature of the first-negative-lens-component side lens surface of the second negative lens component.

Conditional expression (1) defines an air lens formed by the first negative lens component and the second negative lens component. In other words, in a conventional telescopic type vibration reduction lens group, the absolute value of the radius of curvature of the aperture stop side lens surface has been smaller. However, in an imaging lens satisfying conditional expression (1), the air lens formed by the first negative lens component and the second negative lens component has larger absolute value of radius of curvature r1 of the aperture stop side lens surface. With satisfying conditional expression (1), it becomes possible to compose the vibration reduction lens group suitable for an imaging lens having a wide angle of view.

In an imaging lens according to the present embodiment, the following conditional expression (2) is preferably satisfied:

$$0.0<Fa<0.5 \qquad (2)$$

where Fa is a variable defined by the following expression:

$$Fa=(r1+r2)/\max(|r1|,|r2|)$$

where max( ) is a function that returns the largest value among a plurality of values.

Conditional expression (2) defines an appropriate relation between the radius of curvature r1 and that of r2 of the air lens formed by the first negative lens component and the second negative lens component. With satisfying conditional expression (2), the vibration reduction lens group becomes suitable for an imaging lens having a wide angle of view. Moreover, it becomes possible to minimize an inclination of the image plane generated upon moving the vibration reduction lens group in a direction including a component substantially perpendicular to the optical axis.

In an imaging lens according to the present embodiment, the following conditional expression (3) is preferably satisfied:

$$0.5<Fb<2.0 \qquad (3)$$

where Fb is defined by the following expression:

$$Fb=Fgc/|Fg|$$

where Fg denotes a focal length of the rear lens group, which is the vibration reduction lens group, and Fgc denotes a focal length of the positive lens component.

Conditional expression (3) defines a ratio of the focal length of the vibration reduction lens group to the focal length of the positive lens component. With satisfying conditional expression (3), the vibration reduction lens group acquires excellent vibration reduction property, and a lens group disposed to the image side of the vibration reduction lens group can be prevented from getting larger. When the value Fb is equal to or falls below the lower limit of conditional expression (3), although the diameter of the lens group disposed to the image side of the vibration reduction lens group becomes small, the focal lengths of the first negative lens component and the second negative lens component become relatively shorter, so that vibration reduction property and optical performance become worse. Accordingly, it is undesirable. On the other hand, when the value Fb is equal to or exceeds the upper limit of conditional expression (3), the diameter of the lens group disposed to the image side of the vibration reduction lens group becomes large, and the vibration reduction lens group becomes unsuitable for an imaging lens having a wide angle of view, so that it is undesirable.

An imaging lens seen from another point of view according to an embodiment of the present invention will be described below with reference to accompanying drawings. An imaging lens seen from another point of view according to the present embodiment includes, in order from an object side, a first lens group as a front lens group having negative refractive power, a second lens group having positive refractive power, a third lens group as a rear lens group having negative refractive power, and a fourth lens group having positive refractive power. At least one optical surface of the front lens group is applied with an antireflection coating, and the antireflection coating includes at least one layer that is formed by a wet process. Upon varying a focal length (zooming) from a wide-angle end state, which gives the shortest focal length, to a telephoto end state, which gives the longest focal length, each lens group are moved along an optical axis such that a distance between the first lens group and the second lens group decreases, a distance between the second lens group and the third lens group increases, and a distance between the third lens group and the fourth lens group decreases. With this configuration, an imaging lens seen from another point of view according to the present embodiment makes it possible to realize a wide angle of view and excellent vibration reduction performance with suppressing ghost images and flare, so that excellent optical performance can be obtained.

In an imaging lens seen from another point of view according to the present embodiment, at least a portion or the whole of the rear group is made to be a vibration reduction lens group, which is moved in a direction including a component substantially perpendicular to the optical axis. However, the vibration reduction lens group has already been explained above, so that duplicated explanations are omitted.

In an imaging lens seen from another point of view according to the present embodiment, the antireflection coating is a multi-layered film, and the layer formed by the wet process is preferably the outermost layer among the layers composing the multi-layered film. With this configuration, since difference in refractive index with respect to the air can be small, reflection of light can be small, so that ghost images and flare can further be suppressed.

In an imaging lens seen from another point of view according to the present embodiment, when a refractive index of a layer formed by the wet process is denoted by nd, the refractive index nd is preferably 1.30 or less. With this configuration, since difference in refractive index with respect to the air can be small, reflection of light can be small, so that ghost images and flare can further be suppressed.

In an imaging lens seen from another point of view according to the present embodiment, an optical surface on which the antireflection coating is applied is preferably a concave surface. Since ghost images tend to be generated on a lens surface having concave shape among optical surfaces in the front lens group, with applying the antireflection coating to the optical surface, ghost images and flare can be effectively suppressed.

In an imaging lens seen from another point of view according to the present embodiment, the concave surface on which the antireflection coating is applied is preferably an image side lens surface. Since ghost images tend to be generated on the concave surface facing the image side among optical surfaces in the front lens group, with applying the antireflection coating to this optical surface, ghost images and flare can be effectively suppressed.

In an imaging lens seen from another point of view according to the present embodiment, the concave surface on which the antireflection coating is applied is preferably an object side lens surface. Since ghost images tend to be generated on the concave surface among optical surfaces in the front lens group, with applying the antireflection coating to this optical surface, ghost images and flare can be effectively suppressed.

In an imaging lens seen from another point of view according to the present embodiment, an optical surface on which the antireflection coating is applied is preferably a convex surface. Since ghost images tend to be generated on a lens surface having convex shape among optical surfaces in the front lens group, with applying the antireflection coating to this optical surface, ghost images and flare can be effectively suppressed.

In an imaging lens seen from another point of view according to the present embodiment, a convex optical surface on which the antireflection coating is applied is preferably an object side lens surface of the most object side lens in the front lens group. Since ghost images tend to be generated on a lens surface having convex shape in the front lens group, with applying the antireflection coating to this optical surface, ghost images and flare can be effectively suppressed.

In an imaging lens seen from another point of view according to the present embodiment, a convex optical surface on which the antireflection coating is applied is preferably a lens surface of an image side fourth lens counted from the most object side lens in the front lens group. Since ghost images tend to be generated on a lens surface having convex shape, with applying the antireflection coating to this optical surface, ghost images and flare can be effectively suppressed.

In an imaging lens seen from another point of view according to the present embodiment, the antireflection coating may be formed by a dry process not limited to a wet process. In this case, the antireflection coating preferably includes at least one layer with a refractive index at d-line of 1.30 or less. With forming such an antireflection coating by the dry process, the same effect with using the wet process can be obtained. In this case, the layer having the refractive index of 1.30 or less is preferably the outermost layer among the layers composing the multi-layered film.

With composing the rear lens group which is the vibration reduction lens group as shown below in addition to the above described configuration, an imaging lens seen from another point of view according to the present embodiment makes it possible to realize excellent vibration reduction performance in spite of a large aperture and a super wide angle of view. An imaging lens seen from another point of view according to the present embodiment preferably includes an aperture stop in the vicinity of the rear lens group. The rear lens group is preferably composed of, in order from the aperture stop side, a first negative lens component having negative refractive power, a second negative lens component having negative refractive power, and a positive lens component having positive refractive power. Moreover, the second negative lens component side lens surface of the first negative lens component is preferably a concave surface facing the second negative lens component. The second negative lens component is preferably a negative meniscus shape having a concave surface facing the first negative lens component. At least one lens surface among lens surfaces of the first negative lens component, the second negative lens component and the positive lens component is preferably an aspherical surface. With this configuration, it becomes possible to prevent a lens group disposed to the image side of the rear lens group from getting large. With constructing the first negative lens component, the second negative lens component and the positive lens component as a vibration reduction lens group, it becomes possible to minimize decentering coma and partial blurring (asymmetric sharpness) in the meridional image plane and the sagittal image plane generated upon shifting the vibration reduction lens group in a direction including a component substantially perpendicular to the optical axis. Incidentally, the vibration reduction lens group may be constructed by the first negative lens component and the second negative lens component, and a position of the positive lens component may be fixed in a direction substantially perpendicular to the optical axis upon vibration reduction.

In an imaging lens seen from another point of view according to the present embodiment, at least one lens surface among lens surfaces composing the first negative lens component, the second negative lens component and the positive lens component, which form the vibration reduction lens group, is an aspherical surface. With this configuration, it becomes possible to minimize spherical aberration generated upon widening the aperture ratio (faster than f/2.8) and decentering coma and partial blurring (asymmetric sharpness) in the meridional image plane and the sagittal image plane generated upon shifting the vibration reduction lens group in a direction including a component substantially perpendicular to the optical axis.

Moreover, with having positive refractive power, the positive lens component has an effect of downsizing the outer diameter of a lens group disposed to the image side of the rear lens group. Furthermore, the positive lens component is preferably a single lens having a double convex shape. With this configuration, it becomes possible to minimize decentering coma and partial blurring in the meridional image plane and the sagittal image plane generated upon shifting the vibration reduction lens group in a direction including a component substantially perpendicular to the optical axis.

In an imaging lens seen from another point of view according to the present embodiment, when each of the first negative lens component, the second negative lens component and the positive lens component is constructed by a single lens, chromatic difference in curvature of field in the telephoto end state tends to be generated. When glass materials having low dispersion are chosen as lens mediums, chromatic difference in curvature of field can be suppressed to a certain extent. However, the refractive index of glass material decreases resulting in trade-off relation with generation of decentering coma.

Accordingly, in an imaging lens seen from another point of view according to the present embodiment, at least one of the first negative lens component, the second negative lens component and the positive lens component is preferably a cemented lens constructed by a negative lens cemented with a positive lens. With this configuration, it becomes possible to excellently correct chromatic difference in curvature of field in the telephoto end state. Although two or more of these lens components may be cemented lenses, for the purpose of saving weight, each lens component other than the cemented lens is preferably a single lens.

In an imaging lens seen from another point of view according to the present embodiment, when one lens component is made to be a cemented lens, the cemented surface of the cemented lens is preferably a concave surface facing the aperture stop. With this configuration, it becomes possible to excellently suppress generation of chromatic difference in curvature of field upon shifting the vibration reduction lens group in a direction including a component substantially perpendicular to the optical axis.

In an imaging lens seen from another point of view according to the present embodiment, although the rear lens group is composed of the first negative lens component, the second negative lens component and the positive lens component, another lens component may be added adjacent outside to the first negative lens component or the positive lens component.

In an imaging lens seen from another point of view according to the present embodiment, the following conditional expression (1) is preferably satisfied:

$$|r2|<|r1| \quad (1)$$

where r1 denotes a radius of curvature of the second-negative-lens-component side lens surface of the first negative lens component, and r2 denotes a radius of curvature of the first-negative-lens-component side lens surface of the second negative lens component.

Conditional expression (1) defines an air lens formed by the first negative lens component and the second negative lens component. However, conditional expression (1) has already been explained above, so that duplicated explanations are omitted.

In an imaging lens seen from another point of view according to the present embodiment, the following conditional expression (2) is preferably satisfied:

$$0.0<Fa<0.5 \quad (2)$$

where Fa is a variable defined by the following expression:

$$Fa=(r1+r2)/\max(|r1|,|r2|)$$

where max( ) is a function that returns the largest value among a plurality of values.

Conditional expression (2) defines an appropriate relation between the radius of curvature r1 and that of r2 of the air lens formed by the first negative lens component and the second negative lens component. However, conditional expression (2) has already been explained above, so that duplicated explanations are omitted.

In an imaging lens seen from another point of view according to the present embodiment, the following conditional expression (3) is preferably satisfied:

$$0.5<Fb<2.0 \quad (3)$$

where Fb is defined by the following expression:

$$Fb=Fgc/|Fg|$$

where Fg denotes a focal length of the rear lens group including the vibration reduction lens group, which is the vibration reduction lens group, and Fgc denotes a focal length of the positive lens component.

Conditional expression (3) defines a ratio of the focal length of the rear lens group including the vibration reduction lens group to the focal length of the positive lens component. However, conditional expression (3) has already been explained above, so that duplicated explanations are omitted.

Figure 18:
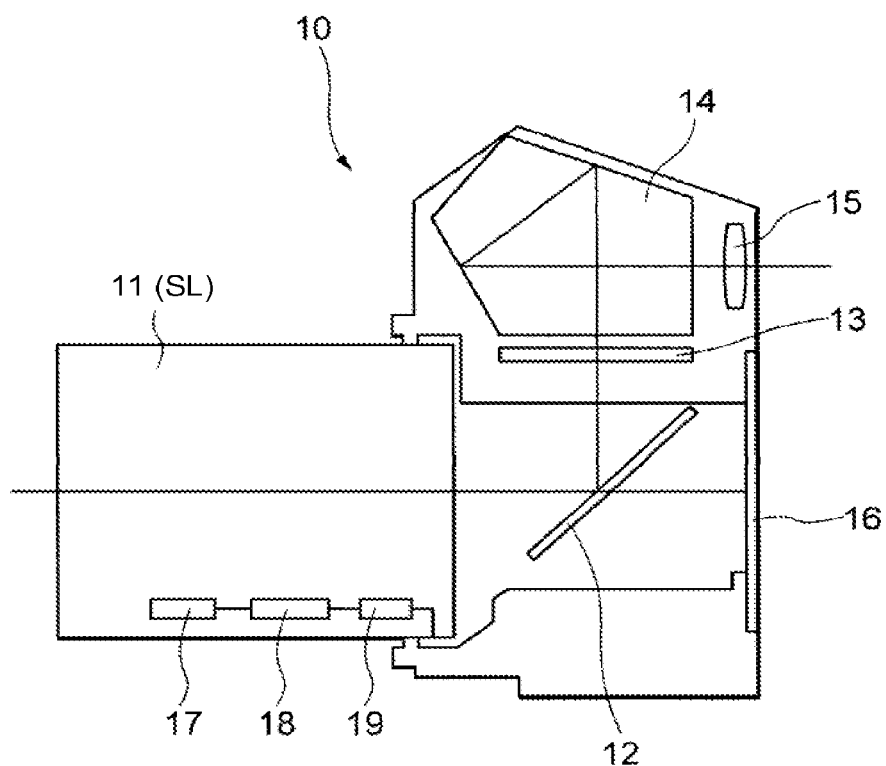
FIG. 18 is a sectional view showing a single-lens reflex camera equipped with the imaging lens according to the present embodiment.

FIG. 18 shows a schematic view of an optical apparatus (a single-lens reflex camera) equipped with an imaging lens according to the present embodiment.

In FIG. 18, light rays from an unillustrated object are converged by an imaging lens 11 (SL), and an image is formed on a focusing screen 13 via a quick return mirror 12. Then, the light rays, of which the image is formed on the focusing screen 13, are reflected plural times within a pentagonal roof prism 14 and led to an eyepiece 15. A photographer is thereby capable of observing the object as an erected image via the eyepiece 15.

After fixing composition of the picture of the object through the eyepiece 15 with pressing an unillustrated release button half way down, the photographer presses the release button all the way down. When the release button is pressed all the way down, the quick return mirror 12 leaps up, and the light rays from the unillustrated object form an object image on an imaging device 16. Accordingly, the light rays emitted from the object are captured by the imaging device 16, and stored in an unillustrated memory as a photographed image of the object.

When the release button is pressed all the way down, a sensor 17 (such as an angular sensor) installed in the imaging lens 11 detects an inclination of the imaging lens 11 and transmits this to a CPU 18. Then, an amount of rotational camera shake is calculated by the CPU 18, and a lens driver 19 that drives a vibration reduction lens group in a direction including a component substantially perpendicular to the optical axis is driven, thereby correcting an image blur on the imaging device 16 upon generating a camera shake. In this manner, the camera 10, which is the optical apparatus equipped with the imaging lens 11 according to the present embodiment, is constructed. Incidentally, the camera 10 shown in FIG. 18 may be a one that removably holds the imaging lens 11, or a one that integrally holds the imaging lens 11. Moreover, the camera 10 may be constructed as a so-called single lens reflex camera and may also be constructed as a mirror-less camera including none of the quick return mirror.

Incidentally, the following description may suitably be applied within limits that do not deteriorate optical performance.

In the present embodiment, although a lens system is composed of four movable lens groups, a lens system that a lens group is added between respective lens groups, or a lens group is added to the image side or the object side of the lens system is possible.

In the present embodiment, although an imaging lens having a four-lens-group configuration has been shown, the present embodiment may also be applied to a five-lens-group configuration and a six-lens-group configuration. A lens configuration that a lens or a lens group is added adjacent to the most object side or the image side of the imaging lens is possible. Incidentally, a lens group is a lens portion constructed by at least one lens separated by air spaces that vary upon zooming. Moreover, a lens component is a single lens or a cemented lens constructed by cementing a plurality of lenses.

Moreover, an imaging lens according to the present embodiment may be composed of, in order from the object side, a first lens group as a front lens group having negative refractive power, a second lens group having negative refractive power, a third lens group having positive refractive power, a fourth lens group as a rear lens group having negative refractive power, and a fifth lens group having positive refractive power.

In an imaging lens according to the present embodiment, although a full-open f-number is about 2.8 and the zoom ratio is about 2 to 2.5, the imaging lens may be a fixed-focal-length lens that does not vary the focal length. Moreover, an angle of view is preferably 100 degrees or more in the wide-angle end state and about 50 degrees in the telephoto end state.

Above-described each structural element of the embodiment only shows a specific example for the purpose of better understanding of the present invention. Accordingly, it is needless to say that the invention in its broader aspect is not limited to the specific details and representative devices shown and described herein.

Figure 19:
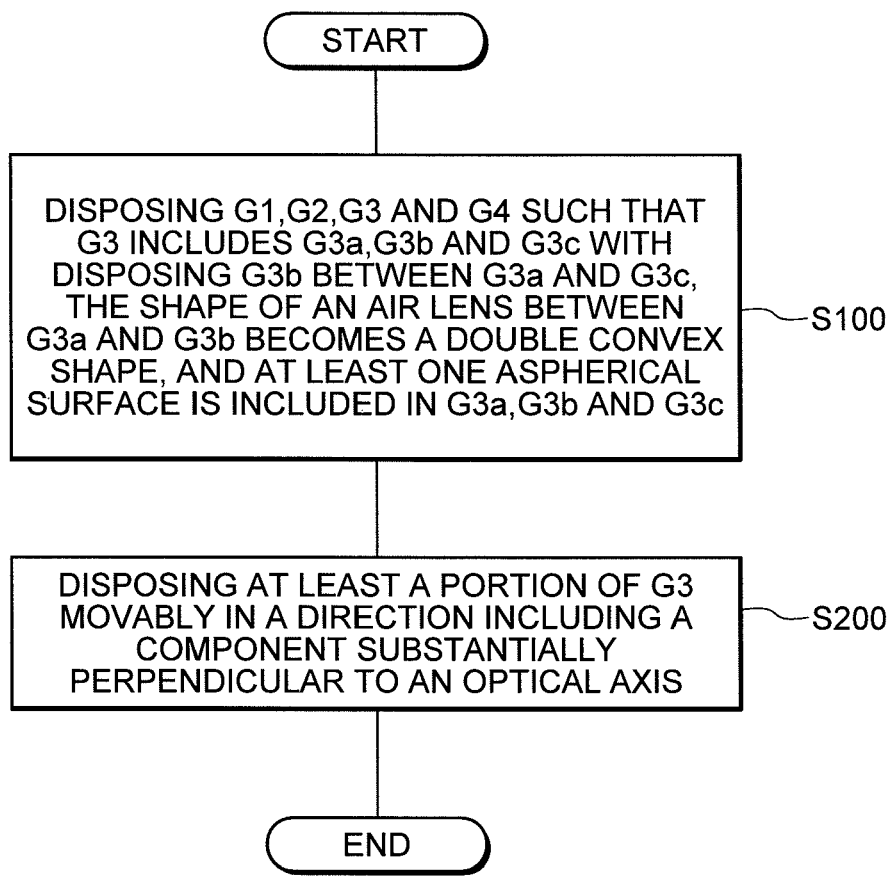
FIG. 19 is an explanatory flowchart of a method for manufacturing the imaging lens according to the present embodiment.

Then, an outline of a method for manufacturing an imaging lens according to the present embodiment is explained below with reference to FIG. 19. Although an example using an imaging lens SL1 according to Example 1 explained later shown in FIG. 1 is explained as a specific example, when the position of the rear lens group including the vibration reduction lens group is varied in the other Examples, the reference symbol should be changed the wording of phrase according to each Example.

Step S100: providing each lens group with disposing each lens. In this instance, a front lens group composed of a first lens group G1 having negative refractive power is disposed to the most object side, and a rear lens group composed of a third lens group G3 having negative refractive power including a vibration reduction lens group is disposed to the image side of the front lens group, and a second lens group G2 having positive refractive power is disposed between the first lens group G1 and the third lens group G3.

In the third lens group G3, a first negative lens component G3a having negative refractive power, a second negative lens component G3b having negative refractive power with a negative meniscus shape, and a positive lens component G3c having positive refractive power are disposed such that the second negative lens component G3b is disposed between the first negative lens component G3a and the positive lens component G3c, a shape of an air lens formed between the first negative lens component G3a and the second negative lens component G3b is a double convex shape, and an aspherical surface is formed at least one lens surface of the first negative lens component G3a, the second negative lens component G3b and the positive lens component G3c.

Specifically, with reference to Example 1 explained later, the first lens group G1 is composed of, in order from an object side, a negative meniscus lens L11 having a convex surface facing the object side and aspherical surfaces formed on both sides, a double concave negative lens L12, a double concave negative lens L13 having an aspherical surface formed on the image side by a resin layer, and a double convex positive lens L14. The second lens group G2 is composed of, in order from the object side, a cemented lens CL21 constructed by a negative meniscus lens L21 having a convex surface facing the object side cemented with a double convex positive lens L22, and a double convex positive lens L23. The third lens group G3 is composed of, in order from the object side, an aperture stop S, a first negative lens component G3a composed of a cemented lens CL31 constructed by a positive meniscus lens L31 (positive lens) having a concave surface facing the object side cemented with a double concave negative lens L32 (negative lens), a second negative lens component G3b composed of a negative meniscus lens L33 having a concave surface facing the first negative lens component G3a side, and a positive lens component G3c composed of a double convex positive lens L34. The fourth lens group G4 is composed of, in order from the object side, a cemented lens CL41 constructed by a double convex positive lens L41 cemented with a double concave negative lens L42, a double convex positive lens L43, and a triple-cemented lens CL42 constructed by a negative meniscus lens L44 having a convex surface facing the object side cemented with a double convex positive lens L45 cemented with a negative meniscus lens L46 having a concave surface facing the object side and an aspherical surface formed on the image side lens surface. The imaging lens SL is manufactured by disposing each lens group prepared in this manner.

Here, in an imaging lens seen from another point of view according to the present embodiment, at least one optical surface of the front lens group is applied with an antireflection coating, and the antireflection coating includes at least one layer that is formed by a wet process. Specifically, an antireflection coating is applied to the image side lens surface of the negative meniscus lens L11 and the object side lens surface of the double concave negative lens L12 in the first lens group G1.

Step S200: disposing at least a portion of the third lens group G3 as the rear lens group movably in a direction including a component substantially perpendicular to an optical axis.

Then, each numerical example of an imaging lens according to the present embodiment is explained with reference to accompanying drawings. Incidentally, each of FIGS. 1, 6, 10 and 14 is a sectional view showing a lens configuration, refractive power distribution of an imaging lens SL (SL1 through SL4), and zoom trajectory of each lens group along the optical axis upon zooming from a wide-angle end state to a telephoto end state show by an arrow.

As shown in FIG. 1, the imaging lens SL1 according to Example 1 is a four-lens-group configuration and is composed of, in order from an object side, a first lens group G1 (front lens group) having negative refractive power, a second lens group G2 having positive refractive power, a third lens group G3 having negative refractive power, which is the rear lens group, and a fourth lens group G4 having positive refractive power.

The third lens group G3 is composed of, in order from the object side, an aperture stop S, a first negative lens component G3a having negative refractive power, a second negative lens component G3b having negative refractive power, and a positive lens component G3c having positive refractive power.

Upon zooming from a wide-angle end state to a telephoto end state, each distance between lens groups varies such that a distance between the first lens group G1 and the second lens group G2 decreases, a distance between the second lens group G2 and the third lens group G3 increases, and a distance between the third lens group G3 and the fourth lens group G4 decreases.

Moreover, as described later, the third lens group is moved as a vibration reduction lens group in a direction substantially perpendicular to an optical axis, thereby carrying out correction of an image blur (vibration reduction). It is preferable that the aperture stop S in the third lens group G3 is not moved in a direction substantially perpendicular to the optical axis upon carrying out vibration reduction.

Figure 6:
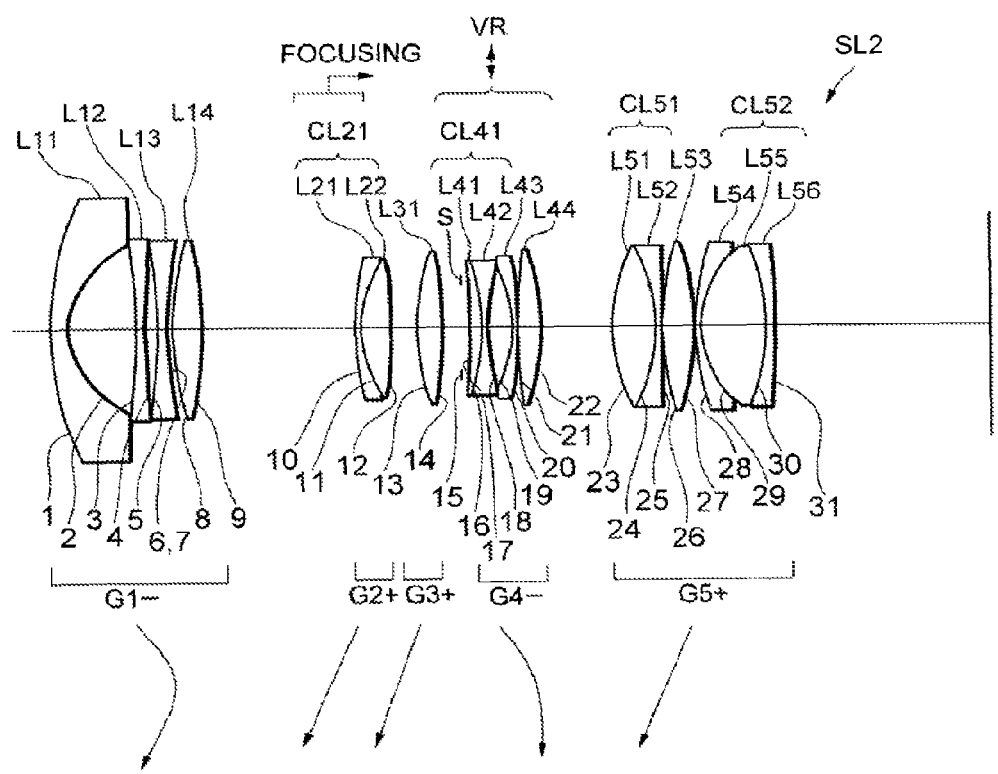
FIG. 6 is a sectional view showing a lens configuration of an imaging lens according to Example 2 of the present application.
Figure 10:
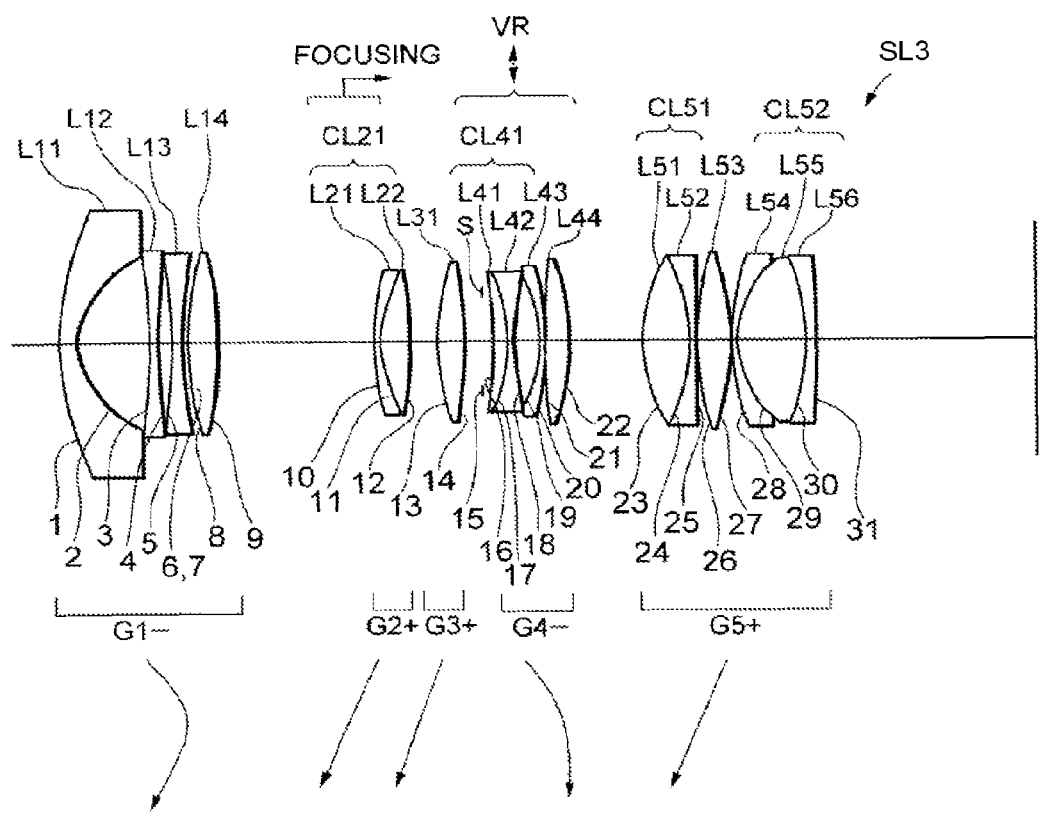
FIG. 10 is a sectional view showing a lens configuration of an imaging lens according to Example 3 of the present application.
Figure 14:
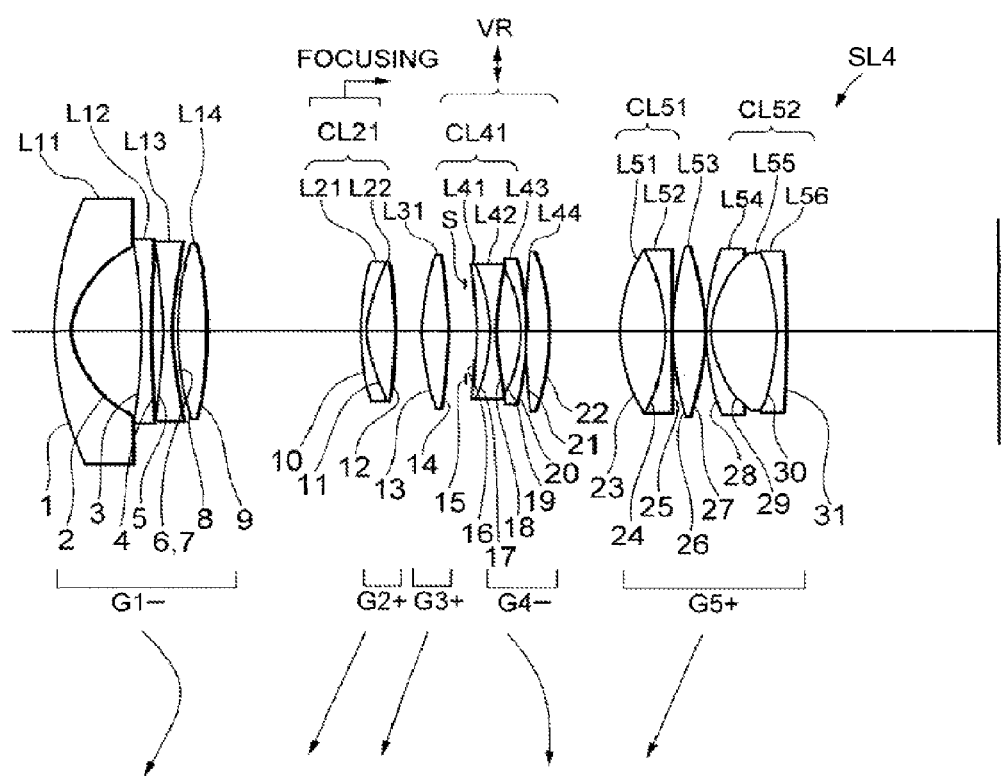
FIG. 14 is a sectional view showing a lens configuration of an imaging lens according to Example 4 of the present application.

Moreover, as shown in FIGS. 6, 10 and 14, each of imaging lenses SL2 through SL4 according to Example 2 through Example 4, respectively, is a five-lens-group configuration and is composed of, in order from an object side, a first lens group G1 (front lens group) having negative refractive power, a second lens group G2 having positive refractive power, a third lens group G3 having positive refractive power, a fourth lens group G4 having negative refractive power, which is a rear lens group, and a fifth lens group G5 having positive refractive power.

The fourth lens group G4 is composed of, in order from the object side, an aperture stop S, a first negative lens component G4a having negative refractive power, a second negative lens component G4b having negative refractive power, and a positive lens component G4c having positive refractive power.

Upon zooming from a wide-angle end state to a telephoto end state, each distance between lens groups varies such that a distance between the first lens group G1 and the second lens group G2 decreases, a distance between the second lens group G2 and the third lens group G3 varies, a distance between the third lens group G3 and the fourth lens group G4 increases, and a distance between the fourth lens group G4 and the fifth lens group G5 decreases.

Moreover, as described later, the fourth lens group G4 is moved as a vibration reduction lens group in a direction substantially perpendicular to an optical axis, thereby carrying out correction of an image blur (vibration reduction). It is preferable that the aperture stop S in the third lens group G4 is not moved in a direction substantially perpendicular to the optical axis upon carrying out vibration reduction.

In each Example, an aspherical surface is expressed by the following expression (a) where y is a height in the direction vertical to the optical axis, S(y) is a distance (sag amount) along the optical axis from a tangent plane of a vertex of each aspherical surface at the height y up to each aspherical surface, r is a radius of curvature (paraxial radius of curvature) of a reference sphere, k is a conical coefficient and An is an n-th order aspherical surface coefficient:

$$S(y)=(y^2/r)/[1+(1-ky^2/r^2)^{1/2}]+A3\times|y|^3+A4\times y^4+A5\times|y|^5+A6\times y^6+A7\times|y|^7+A8\times y^8+A9\times|y|^9+A10\times y^{10}+A11\times|y|^{11}+A12\times y^{12}$$ (a).

It should be noted that a second order aspherical surface coefficient A2 and aspherical surface coefficients A3, A5, A7, A9 and A11 are "0" in each Example. Incidentally, [E-n] represents [×10$^{-n}$]. Further, the aspherical surface is attached with a mark "*" on the left side of a surface number in (Lens Surface Data) of each Example.

Example 1

FIG. 1 is a sectional view showing a lens configuration of an imaging lens SL1 according to Example 1. In the imaging lens SL1 shown in FIG. 1, the first lens group G1 is composed of, in order from the object side, a negative meniscus lens L11 having a convex surface facing the object side and aspherical surfaces formed on both sides, a double concave negative lens L12, a double concave negative lens L13 having an aspherical surface formed on the image side lens surface by a resin layer, and a double convex positive lens L14.

The second lens group G2 is composed of, in order from the object side, a cemented lens CL21 constructed by a negative meniscus lens L21 having a convex surface facing the object side cemented with a double convex positive lens L22, and a double convex positive lens L23. The cemented lens CL21 in the second lens group G2 is moved along the optical axis, thereby carrying out focusing from an infinitely distant object to a close object. In this manner, with applying an internal focusing system to the imaging lens, it becomes possible to reduce a load on a focusing motor upon carrying out auto focus, so that quick driving and electric power saving can be achieved.

The first negative lens component G3a in the third lens group G3 is composed of a cemented lens CL31 constructed by, in order from the object side, a positive meniscus lens L31 having a concave surface facing the object side cemented with a double concave negative lens L32. The second negative lens component G3b is composed of a negative meniscus lens L33 having a concave surface facing the first negative lens component G3a side. The positive lens component G3c is composed of a double convex positive lens L34.

With moving the third lens group G3 as a vibration reduction lens group in a direction substantially perpendicular to the optical axis, the imaging lens SL1 makes it possible to correct an image blur (vibration reduction) caused by vibrations of the imaging lens SL1.

The second negative lens component G3b side lens surface of the first negative lens component G3a included in the third lens group G3 is an aspherical surface which is a concave surface facing the second negative lens component G3b side. The second negative lens component G3b is a negative meniscus lens having a concave surface facing the first negative lens component G3a side. With this configuration, it becomes possible to excellently correct decentering coma, inclination of the image plane generated upon moving the vibration reduction lens group in a direction substantially perpendicular to the optical axis. In particular, with introducing an aspherical surface into the vibration reduction lens group, it becomes possible to suppress spherical aberration generated upon making faster the f-number of about 2.8 and decentering coma and inclination of the image plane generated upon moving the vibration reduction lens group in a direction substantially perpendicular to the optical axis.

Moreover, the first negative lens component G3a is the cemented lens CL31 whose cemented surface is a concave surface facing the aperture stop S side. With this configuration, it becomes possible to correct chromatic difference in curvature of field, in particular, chromatic difference in curvature of field in the telephoto state. Moreover, in the third lens group G3 as a vibration reduction lens group, with disposing the positive lens component G3c having positive refractive power to the fourth lens group G4 side of the third lens group G3, it becomes possible to prevent the diameter of the fourth lens group G4 from getting larger, which is a common problem in a super wide-angle zoom lens, without deteriorating vibration reduction performance.

The fourth lens group G4 is composed of, in order from the object side, a cemented lens CL41 constructed by a double convex positive lens L41 cemented with a double concave negative lens L42, a double convex positive lens L43, and a triple-cemented lens CL42 constructed by a negative meniscus lens L44 having a convex surface facing the object side cemented with a double convex positive lens L45 cemented with a negative meniscus lens L46 having a concave surface facing the object side and an aspherical surface formed on the image side lens surface.

In the imaging lens SL1 seen from another point of view according to Example 1 of the present embodiment, an anti-reflection coating explained later is applied on the image side lens surface (surface number 2) of the negative meniscus lens L11 and the object side lens surface (surface number 3) of the double concave negative lens L12 in the first lens group G1.

Various values associated with the imaging lens SL1 according to Example 1 are listed in the following Table 1. In (Specifications) in Table 1, W denotes a wide-angle end state, M denotes an intermediate focal length state, T denotes a telephoto end state, f denotes a focal length, FNO denotes an f-number, 2ω denotes an angle of view, Y denotes an image height, TL denotes a total lens length, and Bf denotes a back focal length. In (Lens Surface Data) in Table 1, "OP" denotes an object plane, "I" denotes an image plane, a surface number "i" represents an order of the lens surface from the object side along the direction in which the light beams travel, "r" denotes a radius of curvature of each optical surface, a distance "d" indicates a distance along an optical axis from each optical surface to the next optical surface, and a refractive index "nd" and an Abbe number "vd" represent values with respect to d-line (wavelength λ=587.6 nm). In (Lens Group Data), "S" denote a start surface number of each lens group.

In (Variable Distances), f denotes a focal length, di denotes a variable distance at the surface number "i", and Bf denotes a back focal length. In (Values for Conditional Expressions), values for respective conditional expressions are shown.

In respective tables for various values, "mm" is generally used for the unit of length such as the focal length, the radius of curvature and the distance to the next lens surface. However, since similar optical performance can be obtained by an optical system proportionally enlarged or reduced its dimension, the unit is not necessarily to be limited to "mm", and any other suitable unit can be used. Incidentally, the radius of curvature "r=∞" indicates a plane surface, and the refractive index "nd=1.00000" of the air is omitted. The explanation of reference symbols is the same in the other Examples. In Example 1, values of aspherical coefficients A3, A5, A7, A9 and A11 are 0, respectively.

TABLE 1

(Specifications)

| | W | M | T |
|---|---|---|---|
| f = | 16.48 | 24.00 | 33.95 |
| FNO = | 2.884 | 2.884 | 2.884 |
| 2ω = | 108° | 84° | 63° |
| Y = | 21.64 | 21.64 | 21.64 |
| TL = | 170.00 | 164.15 | 161.56 |

(Lens Surface Data)

| i | r | d | nd | vd |
|---|---|---|---|---|
| OP | ∞ | ∞ | | |
| *1 | 55.700 | 3.00 | 1.76690 | 46.85 |
| *2 | 14.895 | 12.67 | | |
| 3 | −116.242 | 1.55 | 1.88300 | 40.76 |
| 4 | 156.108 | 2.36 | | |
| 5 | −98.828 | 1.50 | 1.60172 | 53.82 |
| 6 | 74.978 | 0.20 | 1.55389 | 38.09 |
| *7 | 69.232 | 1.00 | | |
| 8 | 61.822 | 5.25 | 1.70021 | 28.28 |
| 9 | −86.463 | (d9) | | |
| 10 | 52.267 | 1.05 | 1.84666 | 23.78 |
| 11 | 25.362 | 5.29 | 1.61469 | 43.67 |
| 12 | −106.021 | 5.34 | | |
| 13 | 45.989 | 4.66 | 1.54698 | 54.26 |
| 14 | −95.889 | (d14) | | |
| 15 | ∞ | 1.54 | Aperture Stop S | |
| 16 | −134.732 | 2.16 | 1.83241 | 24.09 |
| 17 | −42.936 | 1.00 | 1.87807 | 37.28 |
| *18 | 46.466 | 4.55 | | |
| 19 | −27.688 | 0.80 | 1.88300 | 40.76 |
| 20 | −86.930 | 0.15 | | |
| 21 | 138.182 | 4.21 | 1.84666 | 23.78 |
| 22 | −48.202 | (d22) | | |
| 23 | 33.276 | 8.09 | 1.49782 | 82.51 |
| 24 | −34.972 | 1.10 | 1.85364 | 41.50 |
| 25 | 1185.909 | 0.05 | | |
| 26 | 52.640 | 5.97 | 1.49782 | 82.51 |
| 27 | −53.870 | 0.15 | | |
| 28 | 47.612 | 1.10 | 1.88300 | 40.76 |
| 29 | 20.728 | 11.77 | 1.49782 | 82.51 |
| 30 | −42.553 | 1.60 | 1.88300 | 40.76 |
| *31 | −100.578 | (Bf) | | |
| I | ∞ | | | |

TABLE 1-continued (Lens Group Data)

| Group | S | Focal Length |
|---|---|---|
| G1 | 1 | −22.51 |
| G2 | 10 | 35.50 |
| G3 | 15 | −46.90 |
| G4 | 23 | 46.20 |

(Aspherical Surface Data)

Surface Number: 1

κ = 1.000
A4 = −3.191E−06
A6 = 3.912E−09
A8 = −2.338E−12
A10 = −3.890E−15
A12 = 4.026E−18

Surface Number: 2

κ = 0.203
A4 = 6.823E−06
A6 = −5.387E−09
A8 = 1.031E−10
A10 = 0.000E+00
A12 = 0.000E+00

Surface Number: 7

κ = −27.993
A4 = 1.022E−05
A6 = −3.084E−08
A8 = 3.470E−11
A10 = 0.000E+00
A12 = 0.000E+00

Surface Number: 18

κ = 4.319
A4 = −3.261E−06
A6 = 8.254E−10
A8 = −5.135E−11
A10 = 1.568E−13
A12 = 0.000E+00

Surface Number: 31

κ = 7.218
A4 = 1.031E−05
A6 = 8.099E−09
A8 = −7.692E−12
A10 = 1.022E−13
A12 = 4.038E−18

(Variable Distances)

|  | W | M | T |
|---|---|---|---|
| f = | 16.48 | 24.00 | 33.95 |
| d9 = | 27.04 | 11.16 | 1.80 |
| d14 = | 3.17 | 7.34 | 10.71 |
| d22 = | 12.50 | 5.84 | 0.23 |
| Bf = | 38.48 | 48.50 | 63.23 |

(Values for Conditional Expressions)

Fg = −46.900
Fgc = 42.650
(1) r1 = 46.466    r2 = −27.688
(2) Fa = 0.40
(3) Fb = 0.91

Figure 2A:
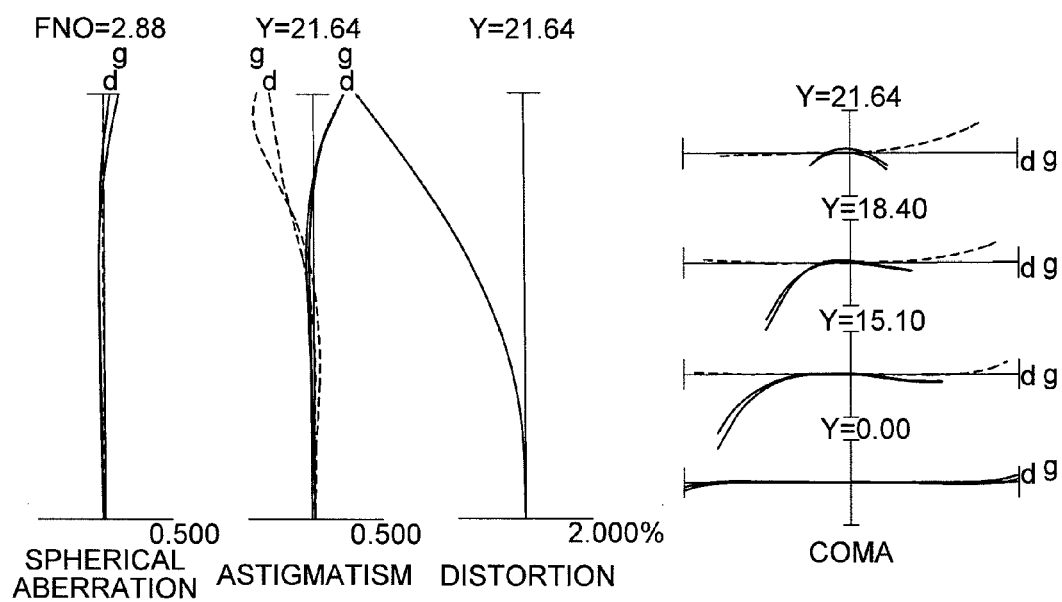
Figure 2B:
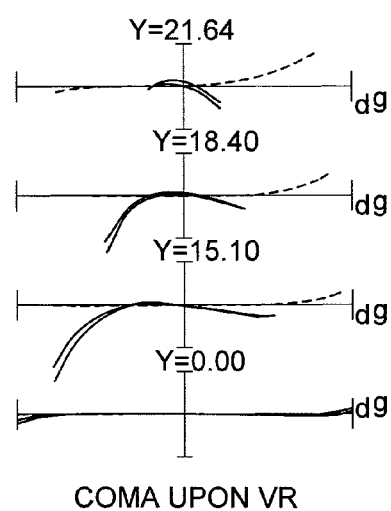
Figure 3A:
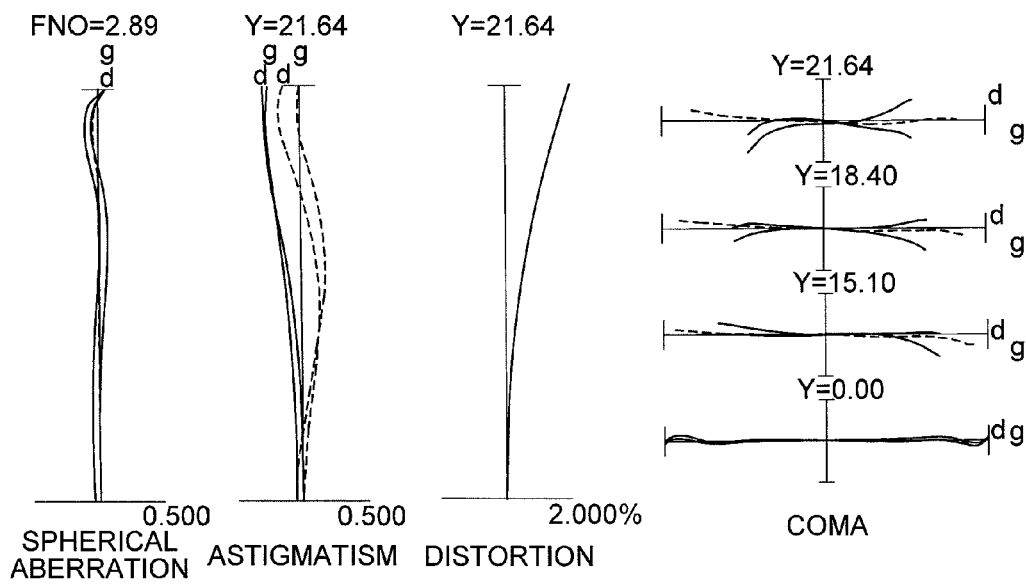
Figure 3B:
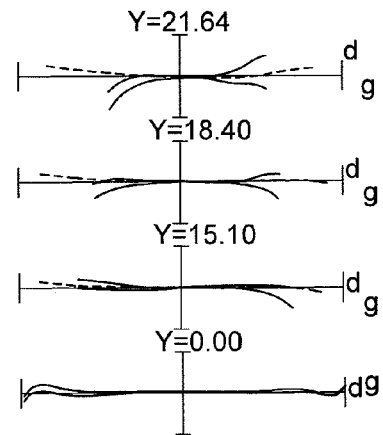
Figure 4A:
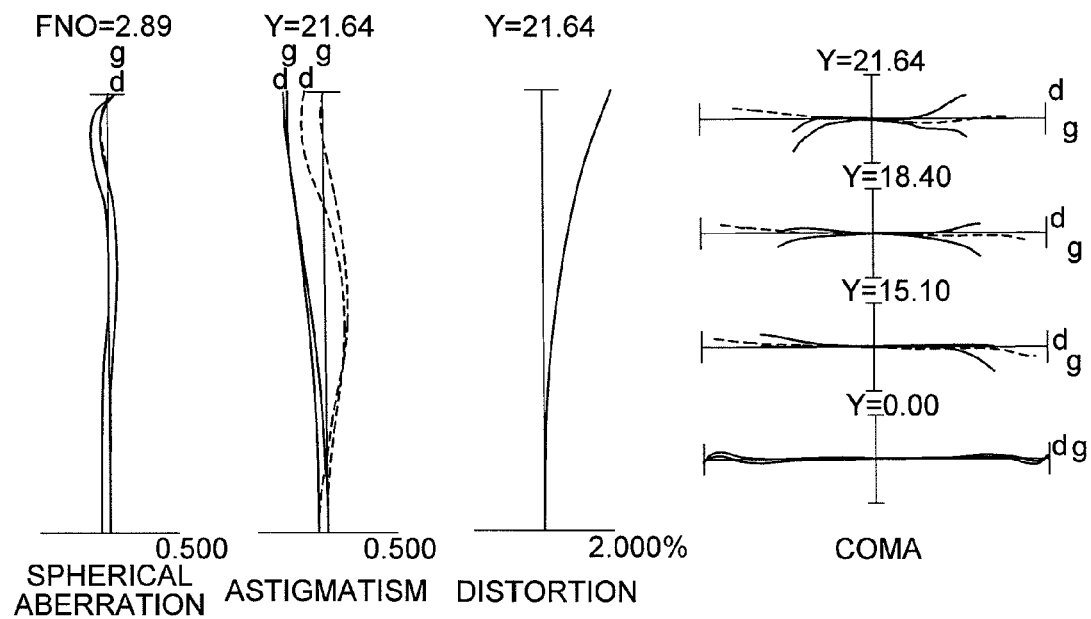
Figure 4B:
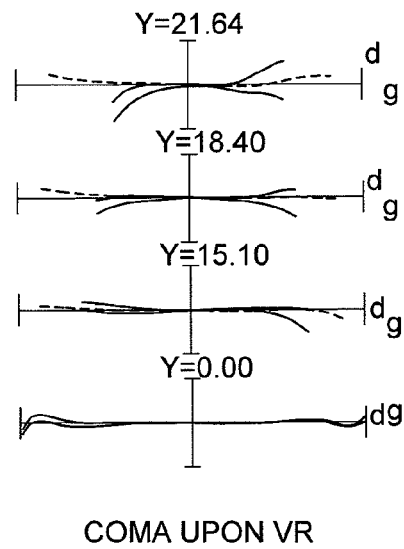

FIGS. 2A and 2B are graphs of various aberrations of the imaging lens according to Example 1 in a wide-angle end state upon focusing on infinity, in which FIG. 2A shows various aberrations without vibration reduction, and FIG. 2B shows coma upon vibration reduction. FIGS. 3A and 3B are graphs of various aberrations of the imaging lens according to Example 1 in an intermediate focal length state upon focusing on infinity, in which FIG. 3A shows various aberrations without vibration reduction, and FIG. 3B shows coma upon vibration reduction. FIGS. 4A and 4B are graphs of various aberrations of the imaging lens according to Example 1 in a telephoto end state upon focusing on infinity, in which FIG. 4A shows various aberrations without vibration reduction, and FIG. 4B shows coma upon vibration reduction. Here, coma upon VR shows value of coma upon carrying out vibration reduction with moving the vibration reduction lens group G3 in a direction substantially perpendicular to the optical axis by an amount of 0.2 mm.

In respective graphs, FNO denotes an f-number, Y denotes an image height, A denotes a half angle of view with respect to each image height, d indicates an aberration curve with respect to d-line (λ=587.6 nm) and g indicates an aberration curve with respect to the g-line (λ=435.8 nm), respectively. In respective graphs showing the astigmatism, a solid line indicates a sagittal image plane, and a broken line indicates a meridional image plane. In respective graphs showing spherical aberration, a solid line shows spherical aberration, and a broken line shows sine condition. Note that the descriptions of these graphs are the same with the subsequent Examples.

As is apparent from the respective graphs the imaging lens SL1 according to Example 1 shows superb optical performance as a result of good corrections to various aberrations in each focal length state from the wide-angle end state through the telephoto end state, even upon shifting the vibration reduction lens group in spite of a large aperture with the f-number of 2.88. Example 1 makes it possible to obtain an imaging lens SL1, which is a super-wide-angle, high-zoom-ratio zoom lens capable of zooming from a super-wide angle of view of 100 degrees or more to a standard angle of view of about 50 degrees, having high vibration reduction performance with excellently correcting aberrations upon vibration reduction, and excellent optical performance with excellently suppressing ghost images and flare.

FIG. 5 is a sectional view showing the configuration of the imaging lens seen from another point of view according to Example 1, illustrating one example of how incident light beams are reflected by a first-ghost-image-generating surface and a second-ghost-image-generating surface.

In FIG. 5, when light beams BM from an object are incident on the imaging lens SL1, the light beams are reflected by the object side lens surface (a first-ghost-image-generating surface whose surface number is 3) of the double concave negative lens L12 of the first lens group G1, and the reflected light beams are reflected again by the image side surface (a second-ghost-image-generating surface whose surface number is 2) of the negative meniscus lens L11 of the first lens group G1 to reach the image plane I with generating ghost images. Incidentally, the first-ghost-image-generating surface 3, and the second-ghost-image-generating surface 2 are both concave surfaces. With forming an antireflection coating corresponding to a broader wavelength range and a wider angle of incidence, it becomes possible to effectively suppress ghost images.

Example 2

FIG. 6 is a sectional view showing a lens configuration of an imaging lens according to Example 2. In the imaging lens SL2 shown in FIG. 6, the first lens group G1 is composed of, in order from the object side, a negative meniscus lens L11 having a convex surface facing the object side and aspherical surfaces formed on both sides, a double concave negative lens L12, a double concave negative lens L13 having an aspherical surface formed on the image side lens surface by a resin layer, and a double convex positive lens L14.

The second lens group G2 is composed of, in order from the object side, a cemented lens CL21 constructed by a negative meniscus lens L21 having a convex surface facing the object side cemented with a double convex positive lens L22. The second lens group G2 is moved along the optical axis, thereby carrying out focusing from an infinitely distant object to a close object. In this manner, with applying an internal focusing system to the imaging lens, it becomes possible to reduce a load on a focusing motor upon carrying out auto focus, so that quick driving and electric power saving can be achieved.

The third lens group G3 is composed of a double convex positive lens L31.

The first negative lens component G4a in the fourth lens group G4 is composed of a cemented lens CL41 constructed by, in order from the object side, a positive meniscus lens L41 having a concave surface facing the object side cemented with a double concave negative lens L42. The second negative lens component G4b is composed of a negative meniscus lens L43 having a concave surface facing the first negative lens component G4a. The positive lens component G4c is composed of a double convex positive lens L44.

With moving the fourth lens group G4 as a vibration reduction lens group in a direction substantially perpendicular to the optical axis, the imaging lens SL2 makes it possible to correct an image blur (vibration reduction) caused by vibrations of the imaging lens SL2.

The second negative lens component G4b side lens surface of the first negative lens component G4a included in the fourth lens group G4 is a concave surface facing the second negative lens component G4b side and an aspherical surface. The second negative lens component G4b is a negative meniscus lens having a concave surface facing the first negative lens component G4a side. With this configuration, it becomes possible to excellently correct decentering coma, inclination of the image plane generated upon moving the vibration reduction lens group in a direction substantially perpendicular to the optical axis. In particular, with introducing an aspherical surface into the vibration reduction lens group, it becomes possible to suppress spherical aberration generated upon making faster the f-number of about 2.8 and decentering coma and inclination of the image plane generated upon moving the vibration reduction lens group in a direction substantially perpendicular to the optical axis.

Moreover, the first negative lens component G4a is the cemented lens CL41 whose cemented surface is a concave surface facing the aperture stop S side. With this configuration, it becomes possible to correct chromatic difference in curvature of field, in particular, chromatic difference in curvature of field in the telephoto state. Moreover, in the fourth lens group G4 as a vibration reduction lens group, with disposing the positive lens component G4c having positive refractive power to the fifth lens group G5 side of the fourth lens group G4, it becomes possible to prevent the diameter of the fifth lens group G5 from getting larger, which is a common problem in a super wide-angle zoom lens, without deteriorating vibration reduction performance.

The fifth lens group G5 is composed of, in order from the object side, a cemented lens CL51 constructed by a double convex positive lens L51 cemented with a double concave negative lens L52, a double convex positive lens L53, and a triple-cemented lens CL52 constructed by a negative meniscus lens L54 having a convex surface facing the object side cemented with a double convex positive lens L55 cemented with a negative meniscus lens L56 having a concave surface facing the object side and an aspherical surface formed on the image side lens surface.

In the imaging lens SL2 seen from another point of view according to Example 2 of the present embodiment, an anti-reflection coating explained later is applied on the image side lens surface (surface number 2) of the negative meniscus lens L11 and the image side lens surface (surface number 4) of the double concave negative lens L12 in the first lens group G1.

Various values associated with the imaging lens SL2 according to Example 2 are listed in the following Table 2.

TABLE 2

(Specifications)

| | W | M | T |
|---|---|---|---|
| f = | 16.48 | 24.00 | 33.95 |
| FNO = | 2.884 | 2.884 | 2.884 |
| 2ω = | 108° | 84° | 63° |
| Y = | 21.64 | 21.64 | 21.64 |
| TL = | 169.32 | 161.04 | 164.28 |

(Lens Surface Data)

| i | r | d | nd | νd |
|---|---|---|---|---|
| OP | ∞ | ∞ | | |
| *1 | 50.943 | 3.00 | 1.76690 | 46.85 |
| *2 | 14.571 | 12.74 | | |
| 3 | −116.435 | 1.55 | 1.88300 | 40.76 |
| 4 | 155.379 | 2.28 | | |
| 5 | −103.837 | 1.50 | 1.60972 | 53.12 |
| 6 | 71.864 | 0.20 | 1.55389 | 38.09 |
| *7 | 64.903 | 1.00 | | |
| 8 | 61.824 | 5.28 | 1.69694 | 28.43 |
| 9 | −82.700 | (d9) | | |
| 10 | 57.224 | 1.05 | 1.84666 | 23.78 |
| 11 | 25.769 | 5.16 | 1.61699 | 43.08 |
| 12 | −104.954 | (d12) | | |
| 13 | 45.674 | 4.89 | 1.55319 | 49.96 |
| 14 | −82.700 | (d14) | | |
| 15 | ∞ | 1.54 | Aperture Stop S | |
| 16 | −137.172 | 2.14 | 1.84666 | 23.78 |
| 17 | −44.700 | 1.00 | 1.87656 | 36.33 |
| *18 | 46.002 | 4.67 | | |
| 19 | −27.961 | 0.80 | 1.88300 | 40.76 |
| 20 | −90.721 | 0.15 | | |
| 21 | 124.583 | 4.30 | 1.84666 | 23.78 |
| 22 | −50.211 | (d22) | | |
| 23 | 31.982 | 8.14 | 1.49782 | 82.51 |
| 24 | −36.308 | 1.10 | 1.85275 | 41.53 |
| 25 | 459.166 | 0.05 | | |
| 26 | 52.795 | 5.92 | 1.49782 | 82.51 |
| 27 | −53.353 | 0.15 | | |
| 28 | 48.593 | 1.10 | 1.88300 | 40.76 |
| 29 | 20.995 | 11.59 | 1.49782 | 82.51 |
| 30 | −41.053 | 1.60 | 1.88300 | 40.76 |
| *31 | −97.910 | (Bf) | | |
| I | ∞ | | | |

(Lens Group Data)

| Group | S | Focal Length |
|---|---|---|
| G1 | 1 | −22.54 |
| G2 | 10 | 85.65 |
| G3 | 13 | 53.92 |
| G4 | 15 | −46.90 |
| G5 | 23 | 46.71 |

(Aspherical Surface Data)

Surface Number: 1

κ = 1.000
A4 = −4.296E−06
A6 = 3.898E−09
A8 = −2.279E−12
A10 = −3.793E−15
A12 = 4.018E−18

TABLE 2-continued

Surface Number: 2

κ = 0.205
A4 = 7.276E−06
A6 = −6.558E−09
A8 = 9.770E−11
A10 = 0.000E+00
A12 = 0.000E+00

Surface Number: 7

κ = −23.978
A4 = 9.573E−06
A6 = −2.997E−08
A8 = 3.432E−11
A10 = 0.000E+00
A12 = 0.000E+00

Surface Number: 18

κ = 4.325
A4 = −3.108E−06
A6 = −3.879E−09
A8 = −1.171E−11
A10 = 3.651E−14
A12 = 0.000E+00

Surface Number: 31

κ = 4.972
A4 = 1.066E−05
A6 = 9.920E−09
A8 = −5.022E−12
A10 = 1.113E−13
A12 = 4.038E−18

(Variable Distances)

| | W | M | T |
|---|---|---|---|
| f = | 16.48 | 24.00 | 33.95 |
| d9 = | 27.37 | 11.19 | 1.59 |
| d12 = | 4.87 | 5.37 | 5.72 |
| d14 = | 3.17 | 6.90 | 9.74 |
| d22 = | 12.50 | 5.81 | 0.30 |
| Bf = | 38.50 | 48.85 | 64.01 |

(Values for Conditional Expressions)

Fg = −46.900
Fgc = 42.751
(1) r1 = 46.002    r2 = −27.961
(2) Fa = 0.39
(3) Fb = 0.91

Figure 7A:
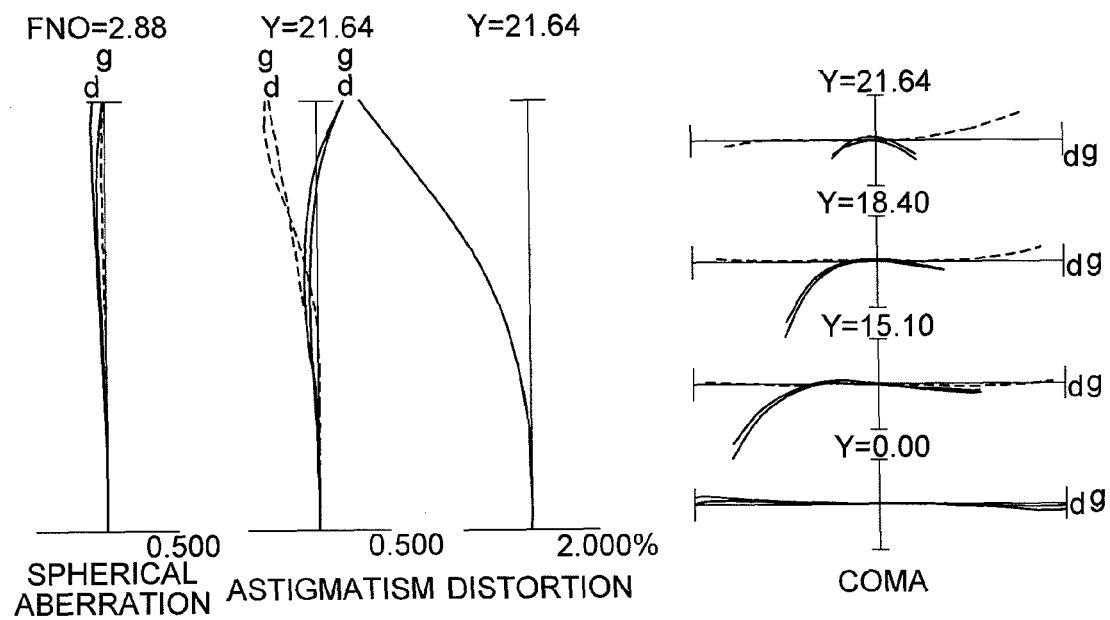
Figure 7B:
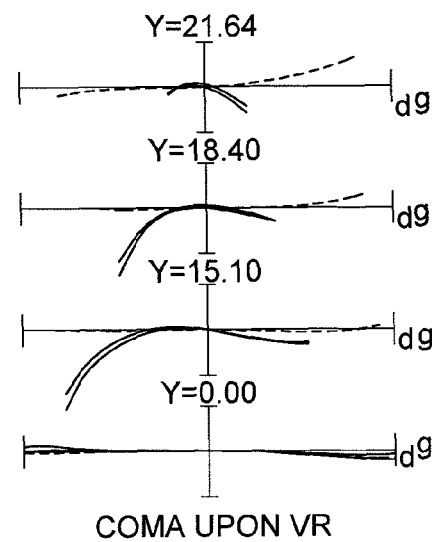
Figure 8A:
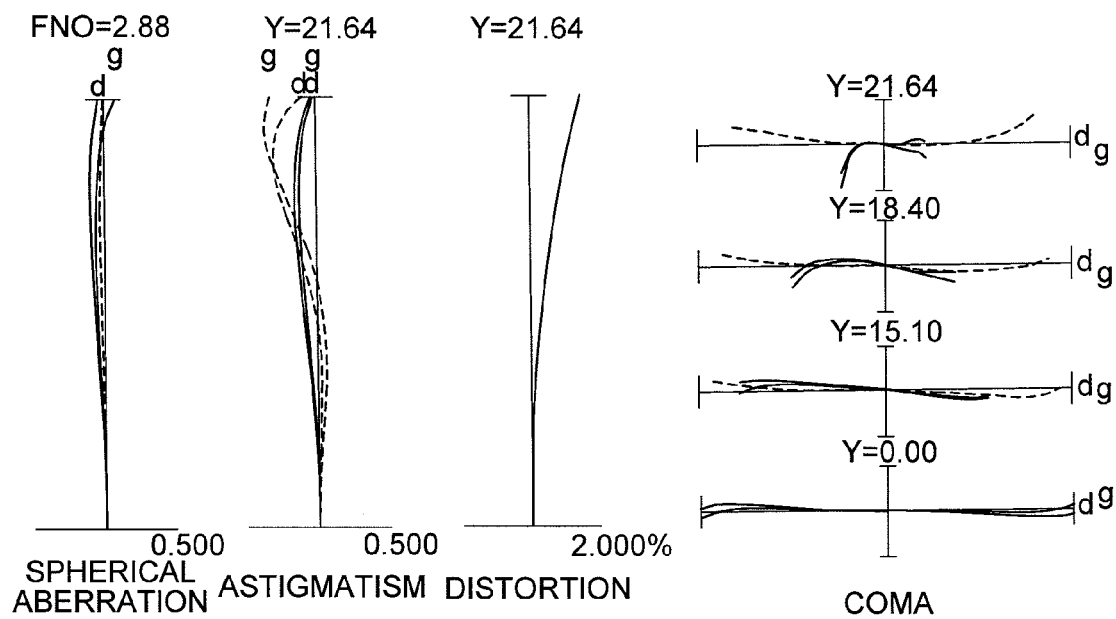
Figure 8B:
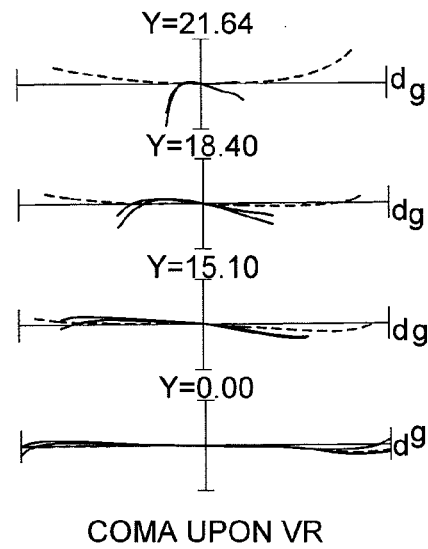
Figure 9A:
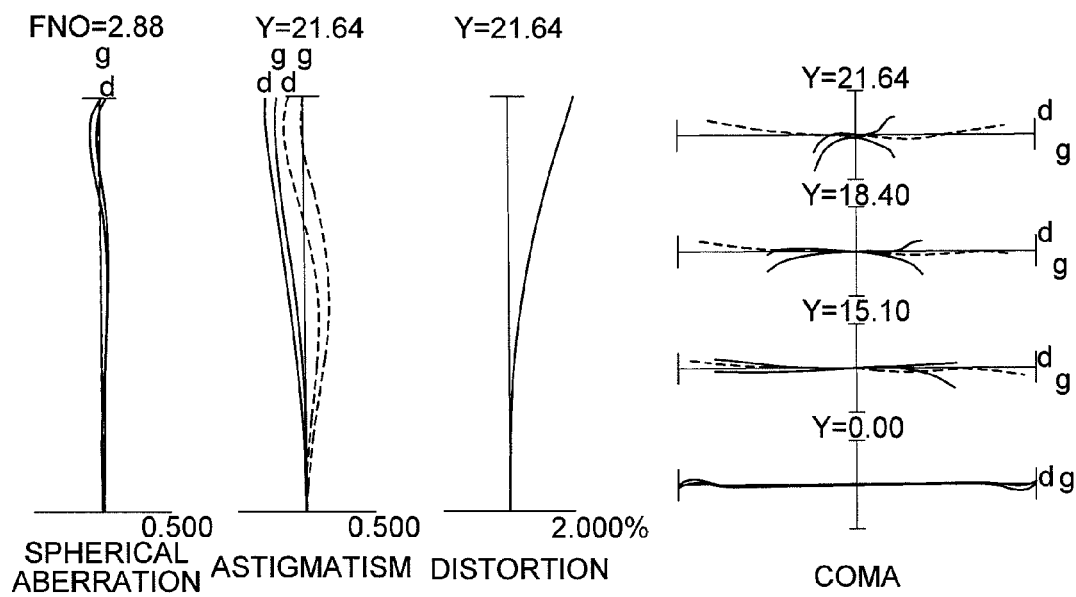
Figure 9B:
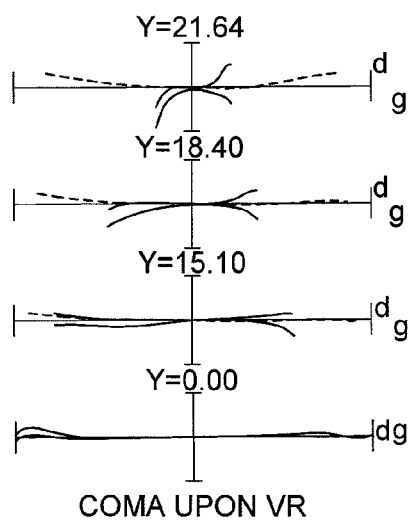

FIGS. 7A and 7B are graphs of various aberrations of the imaging lens according to Example 2 in a wide-angle end state upon focusing on infinity, in which FIG. 7A shows various aberrations without vibration reduction, and FIG. 7B shows coma upon vibration reduction. FIGS. 8A and 8B are graphs of various aberrations of the imaging lens according to Example 2 in an intermediate focal length state upon focusing on infinity, in which FIG. 8A shows various aberrations without vibration reduction, and FIG. 8B shows coma upon vibration reduction. FIGS. 9A and 9B are graphs of various aberrations of the imaging lens according to Example 2 in a telephoto end state upon focusing on infinity, in which FIG. 9A shows various aberrations without vibration reduction, and FIG. 9B shows coma upon vibration reduction. Here, coma upon VR shows value of coma upon carrying out vibration reduction with moving the vibration reduction lens group G3 in a direction substantially perpendicular to the optical axis by an amount of 0.2 mm.

As is apparent from the respective graphs the imaging lens SL2 according to Example 2 shows superb optical performance as a result of good corrections to various aberrations in each focal length state from the wide-angle end state through the telephoto end state, even upon shifting the vibration reduction lens group in spite of a large aperture with the f-number of 2.88. Example 2 makes it possible to obtain an imaging lens SL2, which is a super-wide-angle, high-zoom-ratio zoom lens capable of zooming from a super-wide angle of view of 100 degrees or more to a standard angle of view of about 50 degrees, having high vibration reduction performance with excellently correcting aberrations upon vibration reduction, and excellent optical performance with excellently suppressing ghost images and flare.

Example 3

FIG. 10 is a sectional view showing a lens configuration of an imaging lens according to Example 3. In the imaging lens SL3 shown in FIG. 10, the first lens group G1 is composed of, in order from the object side, a negative meniscus lens L11 having a convex surface facing the object side and aspherical surfaces formed on both sides, a double concave negative lens L12, a double concave negative lens L13 having an aspherical surface formed on the image side lens surface by a resin layer, and a double convex positive lens L14.

The second lens group G2 is composed of, in order from the object side, a cemented lens CL21 constructed by a negative meniscus lens L21 having a convex surface facing the object side cemented with a double convex positive lens L22. The second lens group G2 is moved along the optical axis, thereby carrying out focusing from an infinitely distant object to a close object. In this manner, with applying an internal focusing system to the imaging lens, it becomes possible to reduce a load on a focusing motor upon carrying out auto focus, so that quick driving and electric power saving can be achieved.

The third lens group G3 is composed of a double convex positive lens L31.

The first negative lens component G4a in the fourth lens group G4 is composed of a cemented lens CL41 constructed by, in order from the object side, a positive meniscus lens L41 having a concave surface facing the object side cemented with a double concave negative lens L42. The second negative lens component G4b is composed of a negative meniscus lens L43 having a concave surface facing the first negative lens component G4a side. The positive lens component G4c is composed of a double convex positive lens L44.

With moving the fourth lens group G4 as a vibration reduction lens group in a direction substantially perpendicular to the optical axis, the imaging lens SL3 makes it possible to correct an image blur (vibration reduction) caused by vibrations of the imaging lens SL3.

The second negative lens component G4b side lens surface of the first negative lens component G4a included in the fourth lens group G4 is a concave surface facing the second negative lens component G4b side. The second negative lens component G4b is a negative meniscus lens having a concave surface facing the first negative lens component G4a side and the positive lens component G4c side lens surface is an aspherical surface. With this configuration, it becomes possible to excellently correct decentering coma, inclination of the image plane generated upon moving the vibration reduction lens group in a direction substantially perpendicular to the optical axis. In particular, with introducing an aspherical surface into the vibration reduction lens group, it becomes possible to suppress spherical aberration generated upon making faster the f-number of about 2.8 and decentering coma and inclination of the image plane generated upon moving the vibration reduction lens group in a direction substantially perpendicular to the optical axis.

Moreover, the first negative lens component G4a is the cemented lens CL41 whose cemented surface is a concave surface facing the aperture stop S side. With this configuration, it becomes possible to correct chromatic difference in curvature of field, in particular, chromatic difference in curvature of field in the telephoto state. Moreover, in the fourth lens group G4 as a vibration reduction lens group, with disposing the positive lens component G4c having positive refractive power to the fifth lens group G5 side of the fourth lens group G4, it becomes possible to prevent the diameter of the fifth lens group G5 from getting larger, which is a common problem in a super wide-angle zoom lens, without deteriorating vibration reduction performance.

The fifth lens group G5 is composed of, in order from the object side, a cemented lens CL51 constructed by a double convex positive lens L51 cemented with a double concave negative lens L52, a double convex positive lens L53, and a triple-cemented lens CL52 constructed by a negative meniscus lens L54 having a convex surface facing the object side cemented with a double convex positive lens L55 cemented with a negative meniscus lens L56 having a concave surface facing the object side and an aspherical surface formed on the image side lens surface.

In the imaging lens SL3 seen from another point of view according to Example 3 of the present embodiment, an anti-reflection coating explained later is applied on the image side lens surface (surface number 2) of the negative meniscus lens L11 and the object side lens surface (surface number 5) of the double concave negative lens L13 in the first lens group G1.

Various values associated with the imaging lens SL3 according to Example 3 are listed in the following Table 3.

TABLE 3

(Specifications)

|  | W | M | T |
|---|---|---|---|
| f = | 16.48 | 24.00 | 33.95 |
| FNO = | 2.884 | 2.884 | 2.884 |
| 2ω = | 108° | 84° | 63° |
| Y = | 21.64 | 21.64 | 21.64 |
| TL = | 169.28 | 161.17 | 164.58 |

(Lens Surface Data)

| i | r | d | nd | νd |
|---|---|---|---|---|
| OP | ∞ | ∞ |  |  |
| *1 | 52.973 | 3.00 | 1.76690 | 46.85 |
| *2 | 14.850 | 12.60 |  |  |
| 3 | −119.014 | 1.55 | 1.88300 | 40.76 |
| 4 | 136.109 | 2.48 |  |  |
| 5 | −97.824 | 1.50 | 1.57965 | 55.96 |
| 6 | 79.989 | 0.20 | 1.55389 | 38.09 |
| *7 | 72.446 | 1.00 |  |  |
| 8 | 64.497 | 5.09 | 1.69974 | 28.30 |
| 9 | −87.132 | (d9) |  |  |
| 10 | 58.371 | 1.05 | 1.84666 | 23.78 |
| 11 | 26.261 | 5.08 | 1.61508 | 43.13 |
| 12 | −102.896 | (d12) |  |  |
| 13 | 45.706 | 4.82 | 1.55450 | 50.90 |
| 14 | −86.359 | (d14) |  |  |
| 15 | ∞ | 1.71 | Aperture Stop S | |
| 16 | −104.348 | 2.45 | 1.83374 | 24.06 |
| 17 | −35.279 | 1.00 | 1.87668 | 36.40 |
| 18 | 49.535 | 4.55 |  |  |
| 19 | −28.181 | 0.80 | 1.88300 | 40.76 |
| *20 | −73.586 | 0.15 |  |  |
| 21 | 142.004 | 4.14 | 1.84666 | 23.78 |
| 22 | −52.132 | (d22) |  |  |
| 23 | 32.791 | 8.24 | 1.49782 | 82.51 |
| 24 | −35.532 | 1.10 | 1.84809 | 41.65 |
| 25 | 1291.165 | 0.05 |  |  |
| 26 | 50.902 | 6.05 | 1.49782 | 82.51 |
| 27 | −55.654 | 0.15 |  |  |
| 28 | 48.297 | 1.10 | 1.88300 | 40.76 |
| 29 | 20.801 | 11.80 | 1.49782 | 82.51 |
| 30 | −41.073 | 1.60 | 1.88300 | 40.76 |
| *31 | −102.841 | (Bf) |  |  |
| I | ∞ |  |  |  |

(Lens Group Data)

| Group | S | Focal Length |
|---|---|---|
| G1 | 1 | −22.58 |
| G2 | 10 | 86.36 |
| G3 | 13 | 54.61 |
| G4 | 15 | −46.90 |
| G5 | 23 | 46.12 |

(Aspherical Surface Data)

Surface Number: 1

κ = 1.000
A4 = −3.243E−06
A6 = 3.427E−09
A8 = −2.701E−12
A10 = −3.037E−15
A12 = 3.682E−18

Surface Number: 2

κ = 0.212
A4 = 7.194E−06
A6 = −2.832E−09
A8 = 9.233E−11
A10 = 0.000E+00
A12 = 0.000E+00

Surface Number: 7

κ = −31.468
A4 = 9.425E−06
A6 = −3.037E−08
A8 = 3.487E−11
A10 = 0.000E+00
A12 = 0.000E+00

Surface Number: 20

κ = 0.586
A4 = 1.313E−07
A6 = 9.955E−10
A8 = −9.031E−14
A10 = 7.838E−15
A12 = 0.000E+00

Surface Number: 31

κ = 5.145
A4 = 1.073E−05
A6 = 8.287E−09
A8 = −3.717E−12
A10 = 1.076E−13
A12 = 4.038E−18

(Variable Distances)

|  | W | M | T |
|---|---|---|---|
| f = | 16.48 | 24.00 | 33.95 |
| d9 = | 26.94 | 11.02 | 1.61 |
| d12 = | 4.95 | 5.40 | 5.76 |
| d14 = | 3.17 | 6.96 | 10.01 |
| d22 = | 12.50 | 5.73 | 0.15 |
| Bf = | 38.46 | 48.80 | 63.78 |

(Values for Conditional Expressions)

Fg = −46.900
Fgc = 45.484
(1) r1 = 49.53    r2 = −28.18
(2) Fa = 0.43
(3) Fb = 0.97

Figure 11A:
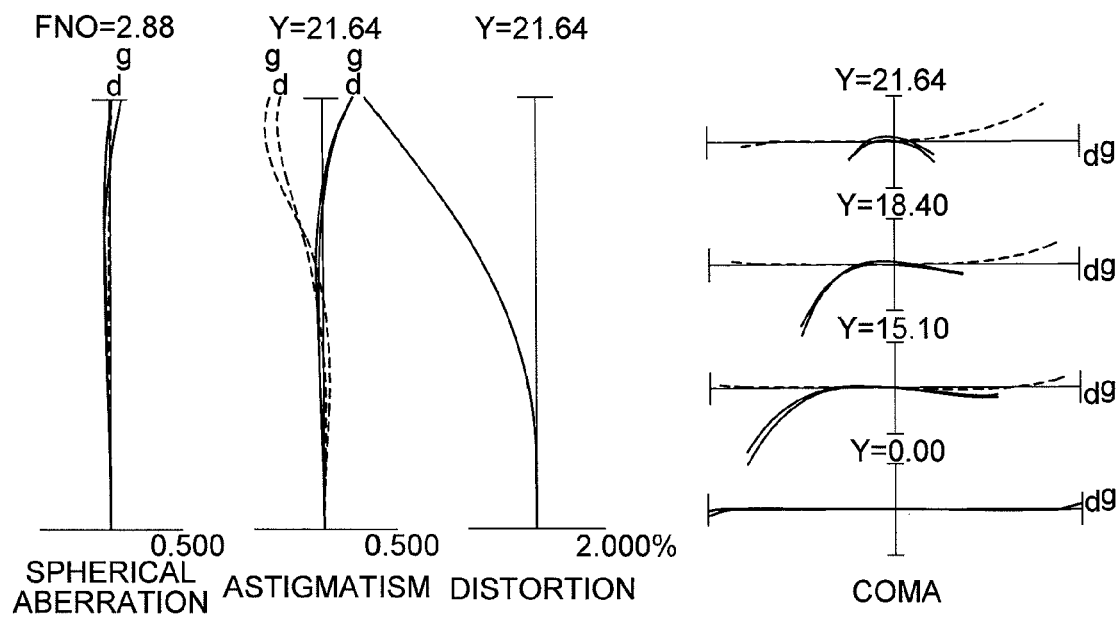
Figure 11B:
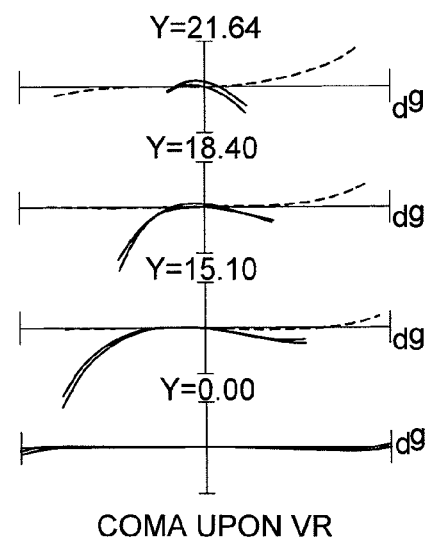
Figure 12A:
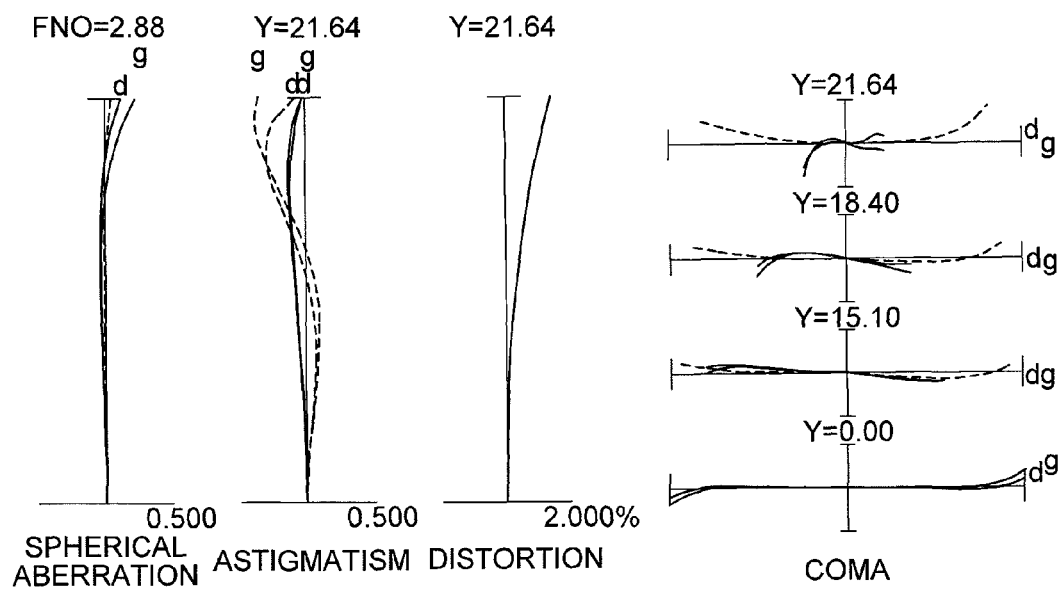
Figure 12B:
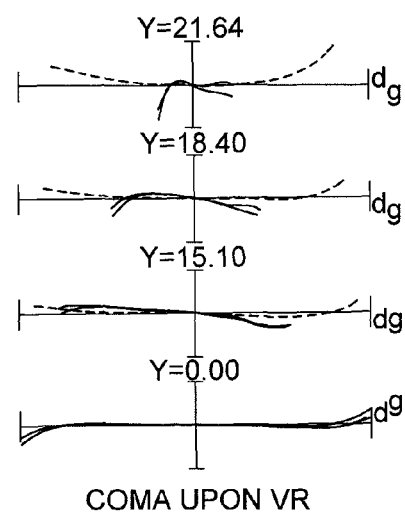
Figure 13A:
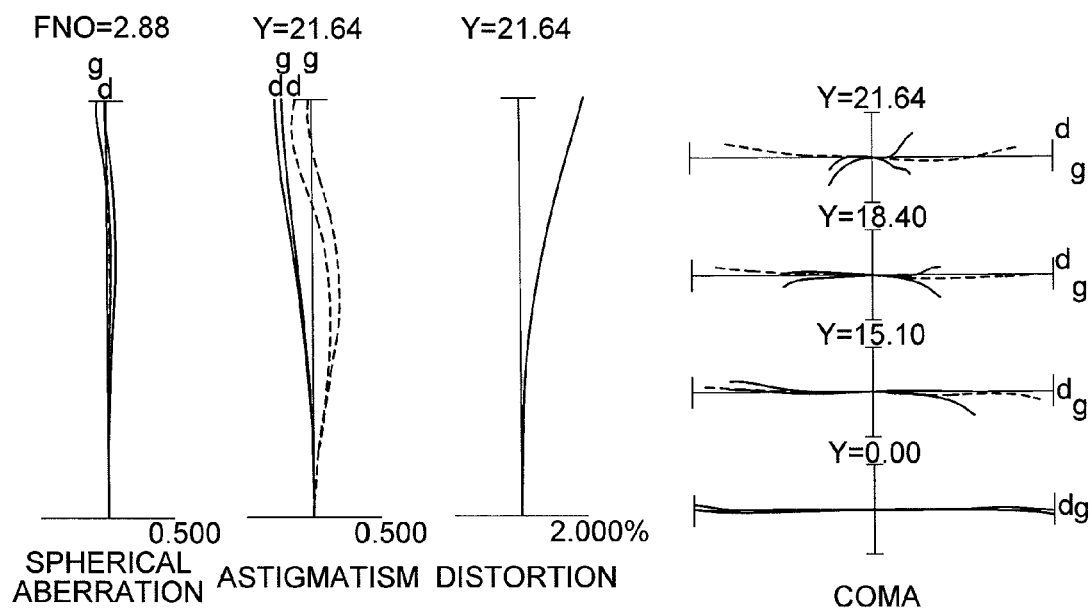
Figure 13B:
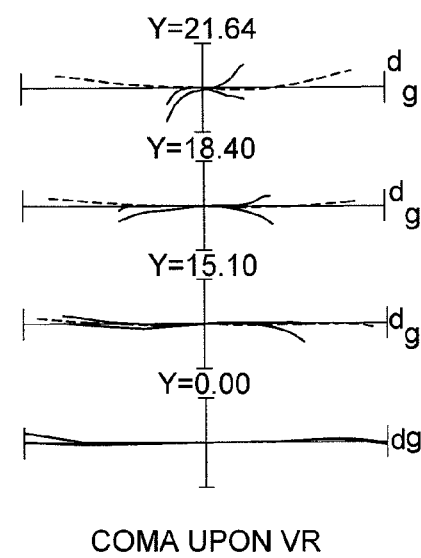

FIGS. 11A and 11B are graphs of various aberrations of the imaging lens according to Example 3 in a wide-angle end state upon focusing on infinity, in which FIG. 11A shows various aberrations without vibration reduction, and FIG. 11B shows coma upon vibration reduction. FIGS. 12A and 12B are graphs of various aberrations of the imaging lens according to Example 3 in an intermediate focal length state upon focusing on infinity, in which FIG. 12A shows various aberrations without vibration reduction, and FIG. 12B shows coma upon vibration reduction. FIGS. 13A and 13B are graphs of various aberrations of the imaging lens according to Example 3 in a telephoto end state upon focusing on infinity, in which FIG. 13A shows various aberrations without vibration reduction, and FIG. 13B shows coma upon vibration reduction. Here, coma upon VR shows value of coma upon carrying out vibration reduction with moving the vibration reduction lens group G3 in a direction substantially perpendicular to the optical axis by an amount of 0.2 mm.

As is apparent from the respective graphs the imaging lens SL3 according to Example 3 shows superb optical performance as a result of good corrections to various aberrations in each focal length state from the wide-angle end state through the telephoto end state, even upon shifting the vibration reduction lens group in spite of a large aperture with the f-number of 2.88. Example 3 makes it possible to obtain an imaging lens SL3, which is a super-wide-angle, high-zoom-ratio zoom lens capable of zooming from a super-wide angle of view of 100 degrees or more to a standard angle of view of about 50 degrees, having high vibration reduction performance with excellently correcting aberrations upon vibration reduction, and excellent optical performance with excellently suppressing ghost images and flare.

Example 4

FIG. 14 is a sectional view showing a lens configuration of an imaging lens according to Example 4. In the imaging lens SL4 shown in FIG. 14, the first lens group G1 is composed of, in order from the object side, a negative meniscus lens L11 having a convex surface facing the object side and aspherical surfaces formed on both sides, a double concave negative lens L12, a double concave negative lens L13 having an aspherical surface formed on the image side lens surface by a resin layer, and a double convex positive lens L14.

The second lens group G2 is composed of, in order from the object side, a cemented lens CL21 constructed by a negative meniscus lens L21 having a convex surface facing the object side cemented with a double convex positive lens L22. The second lens group G2 is moved along the optical axis, thereby carrying out focusing from an infinitely distant object to a close object. In this manner, with applying an internal focusing system to the imaging lens, it becomes possible to reduce a load on a focusing motor upon carrying out auto focus, so that quick driving and electric power saving can be achieved.

The third lens group G3 is composed of a double convex positive lens L31.

The first negative lens component G4a in the fourth lens group G4 is composed of a cemented lens CL41 constructed by, in order from the object side, a positive meniscus lens L41 having a concave surface facing the object side cemented with a double concave negative lens L42. The second negative lens component G4b is composed of a negative meniscus lens L43 having a concave surface facing the first negative lens component G4a side. The positive lens component G4c is composed of a double convex positive lens L44 having an aspherical surface facing the fifth lens group G5 side.

With moving the fourth lens group G4 as a vibration reduction lens group in a direction substantially perpendicular to the optical axis, the imaging lens SL4 makes it possible to correct an image blur (vibration reduction) caused by vibrations of the imaging lens SL4.

The second negative lens component G4b side lens surface of the first negative lens component G4a included in the fourth lens group G4 is a concave surface facing the second negative lens component G4b side. The second negative lens component G4b is a negative meniscus lens having a concave surface facing the first negative lens component G4a side. With this configuration, it becomes possible to excellently correct decentering coma, inclination of the image plane generated upon moving the vibration reduction lens group in a direction substantially perpendicular to the optical axis. In particular, with introducing an aspherical surface into the vibration reduction lens group, it becomes possible to suppress spherical aberration generated upon making faster the f-number of about 2.8 and decentering coma and inclination of the image plane generated upon moving the vibration reduction lens group in a direction substantially perpendicular to the optical axis.

Moreover, the first negative lens component G4a is the cemented lens CL41 whose cemented surface is a concave surface facing the aperture stop S side. With this configuration, it becomes possible to correct chromatic difference in curvature of field, in particular, chromatic difference in curvature of field in the telephoto state. Moreover, in the fourth lens group G4 as a vibration reduction lens group, with disposing the positive lens component G4c having positive refractive power to the fifth lens group G5 side of the fourth lens group G4, it becomes possible to prevent the diameter of the fifth lens group G5 from getting larger, which is a common problem in a super wide-angle zoom lens, without deteriorating vibration reduction performance.

The fifth lens group G5 is composed of, in order from the object side, a cemented lens CL51 constructed by a double convex positive lens L51 cemented with a double concave negative lens L52, a double convex positive lens L53, and a triple-cemented lens CL52 constructed by a negative meniscus lens L54 having a convex surface facing the object side cemented with a double convex positive lens L55 cemented with a negative meniscus lens L56 having a concave surface facing the object side and an aspherical surface formed on the image side lens surface.

In the imaging lens SL4 seen from another point of view according to Example 4 of the present embodiment, an anti-reflection coating explained later is applied on the object side lens surface (surface number 1) of the negative meniscus lens L11 and the object side lens surface (surface number 8) of the double convex positive lens L14 in the first lens group G1.

Various values associated with the imaging lens SL4 according to Example 4 are listed in the following Table 4.

TABLE 4

| (Specifications) | | | |
|---|---|---|---|
| | W | M | T |
| f = | 16.48 | 24.00 | 33.95 |
| FNO = | 2.884 | 2.884 | 2.884 |
| 2ω = | 108° | 84° | 63° |
| Y = | 21.64 | 21.64 | 21.64 |
| TL = | 169.35 | 160.85 | 164.01 |

TABLE 4-continued (Lens Surface Data)

| i | r | d | nd | vd |
|---|---|---|---|---|
| OP | ∞ | ∞ | | |
| *1 | 54.854 | 3.00 | 1.76690 | 46.85 |
| *2 | 14.895 | 12.52 | | |
| 3 | −119.197 | 1.55 | 1.88300 | 40.76 |
| 4 | 153.800 | 2.37 | | |
| 5 | −99.957 | 1.50 | 1.58117 | 55.80 |
| 6 | 70.459 | 0.20 | 1.55389 | 38.09 |
| *7 | 70.337 | 1.00 | | |
| 8 | 58.073 | 5.12 | 1.69870 | 28.35 |
| 9 | −102.834 | (d9) | | |
| 10 | 60.699 | 1.05 | 1.84666 | 23.78 |
| 11 | 26.752 | 5.02 | 1.61593 | 42.00 |
| 12 | −96.705 | (d12) | | |
| 13 | 44.671 | 4.86 | 1.55420 | 52.03 |
| 14 | −85.562 | (d14) | | |
| 15 | ∞ | 1.69 | Aperture Stop S | |
| 16 | −107.454 | 2.32 | 1.83400 | 24.05 |
| 17 | −45.271 | 1.00 | 1.87834 | 37.97 |
| 18 | 48.988 | 4.58 | | |
| 19 | −27.883 | 0.80 | 1.88105 | 40.81 |
| 20 | −84.274 | 0.15 | | |
| 21 | 137.079 | 4.27 | 1.84666 | 23.78 |
| *22 | −48.636 | (d22) | | |
| 23 | 32.159 | 8.01 | 1.49782 | 82.51 |
| 24 | −36.284 | 1.10 | 1.85199 | 41.55 |
| 25 | 486.061 | 0.05 | | |
| 26 | 51.543 | 6.05 | 1.49782 | 82.51 |
| 27 | −53.717 | 0.15 | | |
| 28 | 50.562 | 1.10 | 1.88300 | 40.76 |
| 29 | 21.393 | 11.71 | 1.49782 | 82.51 |
| 30 | −39.794 | 1.60 | 1.88300 | 40.76 |
| *31 | −91.946 | (Bf) | | |
| I | ∞ | | | |

(Lens Group Data)

| Group | S | Focal Length |
|---|---|---|
| G1 | 1 | −22.56 |
| G2 | 10 | 86.18 |
| G3 | 13 | 53.67 |
| G4 | 15 | −46.90 |
| G5 | 23 | 46.64 |

(Aspherical Surface Data)

Surface Number: 1

$\kappa = 1.000$
$A4 = -3.651E-06$
$A6 = 3.597E-09$
$A8 = -1.035E-12$
$A10 = -4.251E-15$
$A12 = 3.834E-18$ Surface Number: 2

$\kappa = 0.180$
$A4 = 5.946E-06$
$A6 = -6.965E-09$
$A8 = 8.384E-11$
$A10 = 0.000E+00$
$A12 = 0.000E+00$ Surface Number: 7

$\kappa = -28.387$
$A4 = 1.150E-05$
$A6 = -2.848E-08$
$A8 = 3.562E-11$
$A10 = 0.000E+00$
$A12 = 0.000E+00$ TABLE 4-continued Surface Number: 22

$\kappa = 0.716$
$A4 = 3.171E-07$
$A6 = 4.652E-10$
$A8 = -1.605E-12$
$A10 = 1.111E-14$
$A12 = 0.000E+00$ Surface Number: 31

$\kappa = 4.852$
$A4 = 1.066E-05$
$A6 = 9.341E-09$
$A8 = -1.234E-13$
$A10 = 9.226E-14$
$A12 = 4.038E-18$ (Variable Distances)

| | W | M | T |
|---|---|---|---|
| f = | 16.48 | 24.00 | 33.95 |
| d9 = | 27.36 | 11.18 | 1.63 |
| d12 = | 5.02 | 5.40 | 5.73 |
| d14 = | 3.17 | 6.73 | 9.47 |
| d22 = | 12.50 | 5.72 | 0.15 |
| Bf = | 38.53 | 49.04 | 64.26 |

(Values for Conditional Expressions)

Fg = −46.900
Fgc = 42.852
(1) r1 = 48.99    r2 = −27.88
(2) Fa = 0.43
(3) Fb = 0.91

Figure 15A:
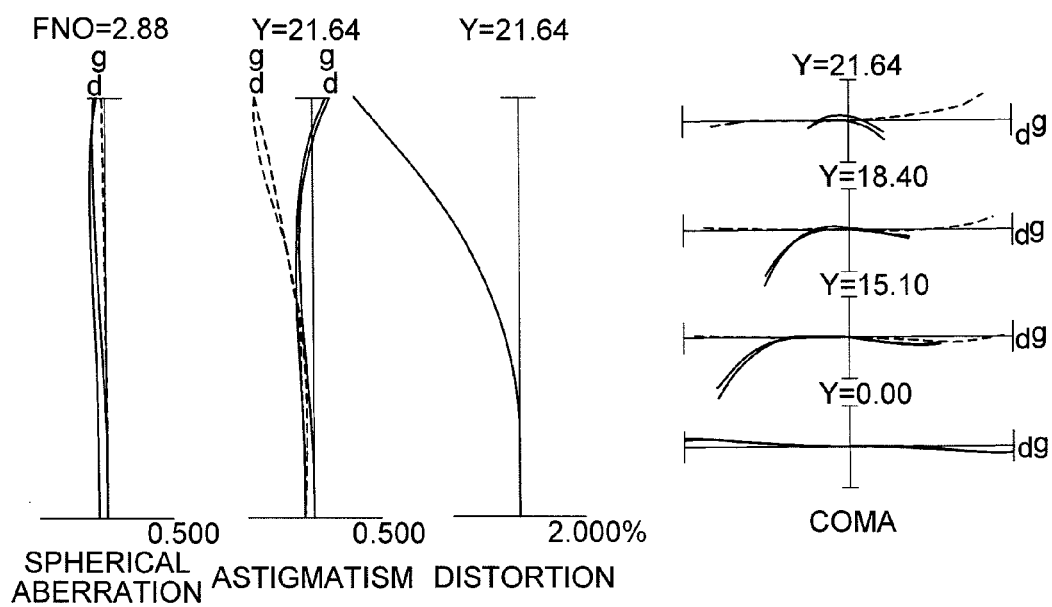
Figure 15B:
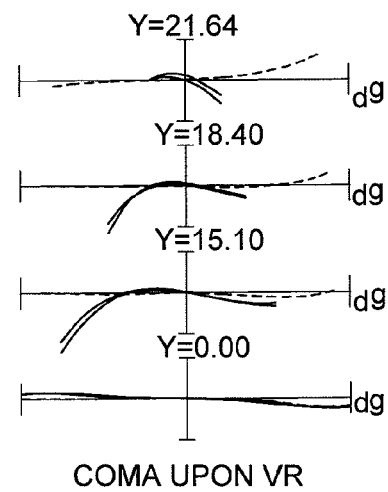
Figure 16A:
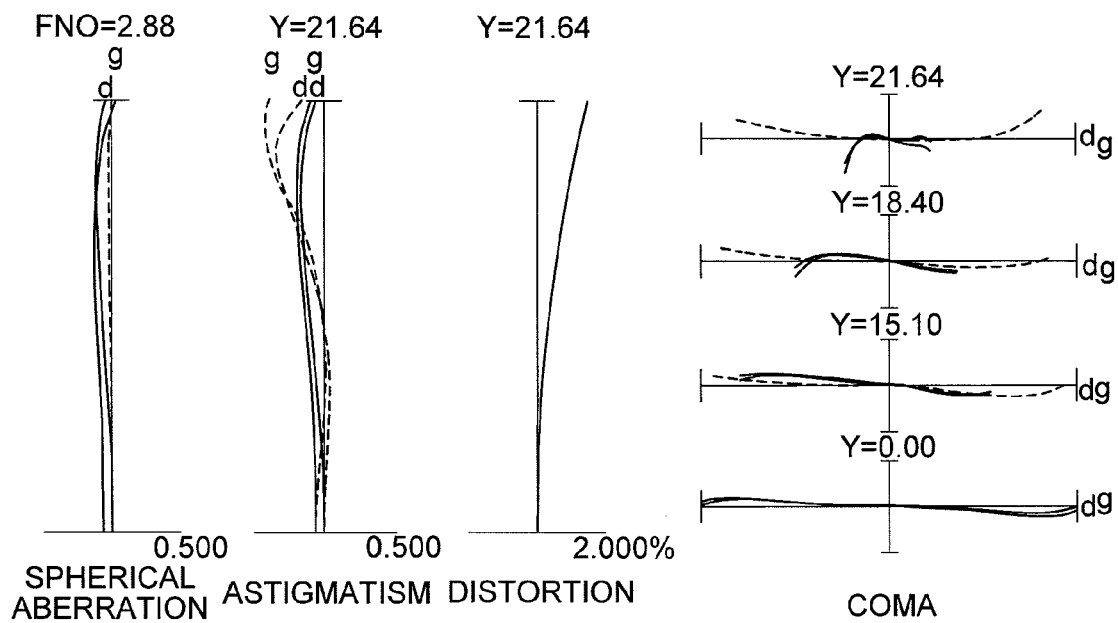
Figure 16B:
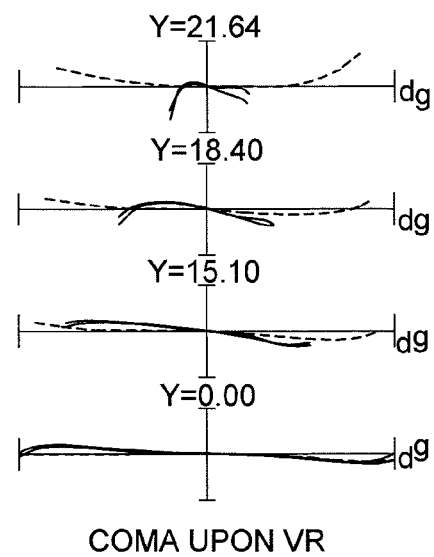
Figure 17A:
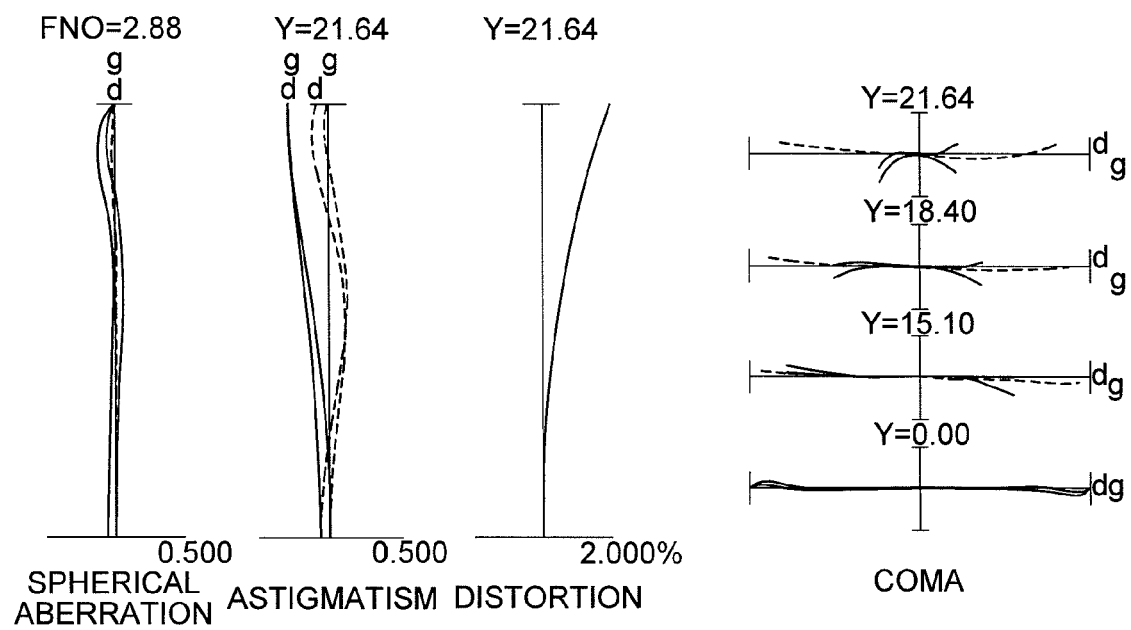
Figure 17B:
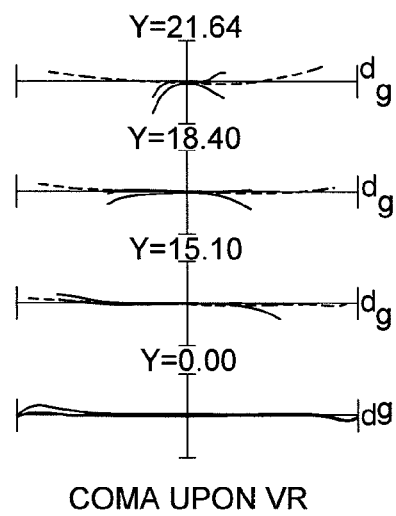

FIGS. 15A and 15B are graphs of various aberrations of the imaging lens according to Example 4 in a wide-angle end state upon focusing on infinity, in which FIG. 15A shows various aberrations without vibration reduction, and FIG. 15B shows coma upon vibration reduction. FIGS. 16A and 16B are graphs of various aberrations of the imaging lens according to Example 4 in an intermediate focal length state upon focusing on infinity, in which FIG. 16A shows various aberrations without vibration reduction, and FIG. 16B shows coma upon vibration reduction. FIGS. 17A and 17B are graphs of various aberrations of the imaging lens according to Example 4 in a telephoto end state upon focusing on infinity, in which FIG. 17A shows various aberrations without vibration reduction, and FIG. 17B shows coma upon vibration reduction. Here, coma upon VR shows value of coma upon carrying out vibration reduction with moving the vibration reduction lens group G3 in a direction substantially perpendicular to the optical axis by an amount of 0.2 mm.

As is apparent from the respective graphs the imaging lens SL4 according to Example 4 shows superb optical performance as a result of good corrections to various aberrations in each focal length state from the wide-angle end state through the telephoto end state, even upon shifting the vibration reduction lens group in spite of a large aperture with the f-number of 2.88. Example 4 makes it possible to obtain an imaging lens SL4, which is a super-wide-angle, high-zoom-ratio zoom lens capable of zooming from a super-wide angle of view of 100 degrees or more to a standard angle of view of about 50 degrees, having high vibration reduction performance with excellently correcting aberrations upon vibration reduction, and excellent optical performance with excellently suppressing ghost images and flare.

Figure 20:
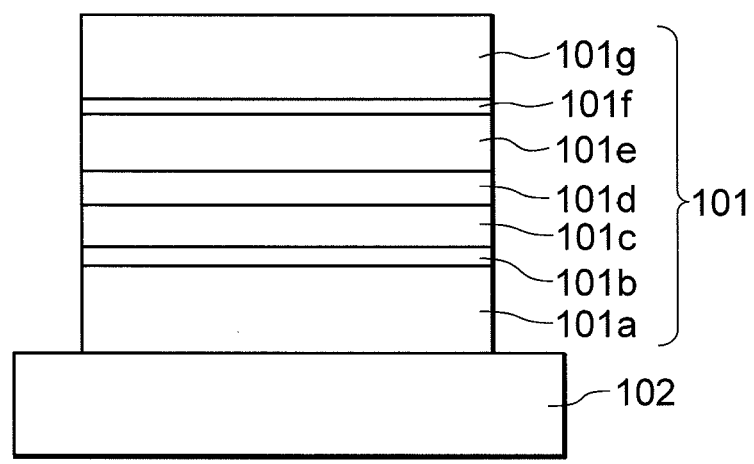
FIG. 20 is an explanatory diagram showing one example of a layer structure of an antireflection coating.

Then, an antireflection coating (which is also referred to as a multi-layered broadband antireflection coating) used for the imaging lens according to the present application will be described. FIG. 20 is a view showing one example of a film structure of the antireflection coating. This antireflection coating 101 is a 7-layered film formed on an optical surface of an optical member 102 such as a lens. A first layer 101a is composed of aluminum oxide that is vapor-deposited by a vacuum evaporation method. A second layer 101b composed of a mixture of titanium oxide and zirconium oxide that are vapor-deposited by the vacuum evaporation method, is further formed on the first layer 101a. Moreover, a third layer 101c composed of the aluminum oxide that is vapor-deposited by the vacuum evaporation method is formed on the second layer 101b. Moreover, a fourth layer 101d composed of the mixture of titanium oxide and zirconium oxide that are vapor-deposited by the vacuum evaporation method, is further formed on the third layer 101c. Moreover, a fifth layer 101e composed of aluminum oxide that is vapor-deposited by the vacuum evaporation method is formed on the fourth layer 101d. Moreover, a sixth layer 101f composed of the mixture of titanium oxide and zirconium oxide that are vapor-deposited by the vacuum evaporation method, is further formed on the fifth layer 101e.

Then, a seventh layer 101g composed of a mixture of magnesium fluoride and silica is formed by a wet process on the thus-formed sixth layer 101f, thus forming the antireflection coating 101 according to the present embodiment. The formation of the seventh layer 101g involves using a sol-gel process classified as one type of the wet process. The sol-gel process is a process of transforming a sol acquired by mixing a material into a gel having no fluidity through hydrolyzing condensation polymerization reaction and acquiring a product by heat-decomposing this gel. In manufacturing an optical thin film, the film may be generated by coating a material sol of the optical thin film over the optical surface of the optical member and dry-solidifying the sol into a gel film. Note that the wet process may involve using, without being limited to the sol-gel process, a process of acquiring a solid-state film through none of the gel state.

In this manner, the first layer 101a through the sixth layer 101f of the antireflection coating 101 are formed by vacuum evaporation method defined as a dry process, and the uppermost seventh layer 101g is formed in the following procedures by the wet process using a sol liquid prepared by a hydrogen fluoride/magnesium acetate process. At first, an aluminum oxide layer serving as the first layer 101a, a titanium oxide-zirconium oxide mixture layer serving as the second layer 101b, an aluminum oxide layer serving as the third layer 101c, a titanium oxide-zirconium oxide mixture layer serving as the fourth layer 101d, an aluminum oxide layer serving as the fifth layer 101e and a titanium oxide-zirconium oxide mixture layer serving as the sixth layer 101f, are formed beforehand in this sequence on an antireflection-coating-forming surface of a lens (the optical surface of the optical member 102 described above) by using a vacuum evaporation apparatus. Then, after taking the optical member 102 out of the evaporation apparatus, the optical member 102 is applied with a sol liquid prepared by the hydrofluoric acid/magnesium acetate method added by silicone alkoxide by means of a spin coat method, so that a layer formed by a mixture of silica and magnesium fluoride, which becomes a seventh layer 101g, is formed. The formula (b) given below is a reaction formula on the occasion of being prepared by the hydrogen fluoride/magnesium acetate process:

2HF+Mg(CH3COO)2→MgF2+2CH3COOH        (b).

The sol liquid used for forming the seventh layer, after mixing the materials and after conducting a high-temperature pressurization maturing process at 140° C. for 24 hours in an autoclave, is used for forming the film. The optical member 102, after finishing the film growth of the seventh layer 101g, undergoes a heating process at 160° C. for one hour in the atmospheric air and is thus completed. With the use of the sol-gel process, particles on the order of several nanometers (nm) to several dozens nanometers (nm) in particle size are deposited while the air gaps remain, thereby forming the seventh layer 101g.

Optical performance of the optical member including the thus-formed antireflection coating 101 will hereinafter be described by using spectral characteristics shown in FIG. 21.

The optical member (lens) including the antireflection coating according to the present embodiment is formed under the conditions shown in the following Table 5. Herein, Table 5 shows respective optical film thicknesses of the layers 101a (the first layer) through 101g (the seventh layer) of the antireflection coating 101, which are obtained under such conditions that λ denotes a reference wavelength and the refractive index of the substrate (optical member) is set to 1.62, 1.74 and 1.85. Note that the Table 5 shows Al2O3 expressed as aluminum oxide, ZrO2+TiO2 expressed as mixture of titanium oxide and zirconium oxide and SiO2+MgF2 expressed as mixture of magnesium fluoride and silica.

TABLE 5

| layer | material | n | thicknesses of layers | | |
|---|---|---|---|---|---|
| | medium air | 1 | | | |
| 7 | MgF2 + SiO2 | 1.26 | 0.268λ | 0.271λ | 0.269λ |
| 6 | ZrO2 + TiO2 | 2.12 | 0.057λ | 0.054λ | 0.059λ |
| 5 | Al2O3 | 1.65 | 0.171λ | 0.178λ | 0.162λ |
| 4 | ZrO2 + TiO2 | 2.12 | 0.127λ | 0.13λ | 0.158λ |
| 3 | Al2O3 | 1.65 | 0.122λ | 0.107λ | 0.08λ |
| 2 | ZrO2 + TiO2 | 2.12 | 0.059λ | 0.075λ | 0.105λ |
| 1 | Al2O3 | 1.65 | 0.257λ | 0.03λ | 0.03λ |
| | n (substrate) | | 1.62 | 1.74 | 1.85 |

Figure 21:
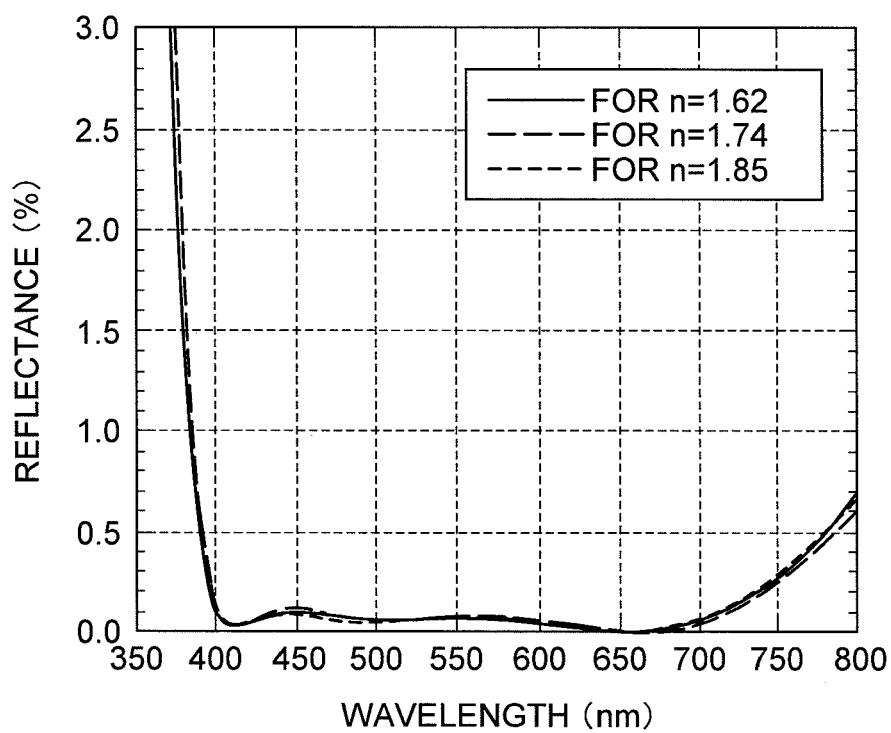
FIG. 21 is a graph showing spectral characteristics of the antireflection coating.

FIG. 21 shows the spectral characteristics when the light beams are vertically incident on the optical member in which the optical film thickness of each of the layers of the antireflection coating 101 is designed, with the reference wavelength λ set to 550 nm in the Table 5.

It is understood from FIG. 21 that the optical member including the antireflection coating 101 designed with the reference wavelength λ set to 550 nm can restrain the reflectance down to 0.2% or less over the entire range in which the wavelengths of the light beams are 420 nm through 720 nm. Further, in Table 5, even the optical member including the antireflection coating 101, in which each optical film thickness is designed with the reference wavelength λ set to d-line (wavelength 587.6 nm), has substantially the same spectral characteristics as in the case where the reference wavelength λ shown in FIG. 21 is 550 nm in a way that affects substantially none of the spectral characteristics thereof.

Then, a modified example of the antireflection coating will be explained. The antireflection coating is a 5-layered film, and, similarly to the Table 5, the optical film thickness of each layer with respect to the reference wavelength λ is designed under conditions shown in the following Table 6. In this modified example, the formation of the fifth layer involves using the sol-gel process described above.

Figure 22:
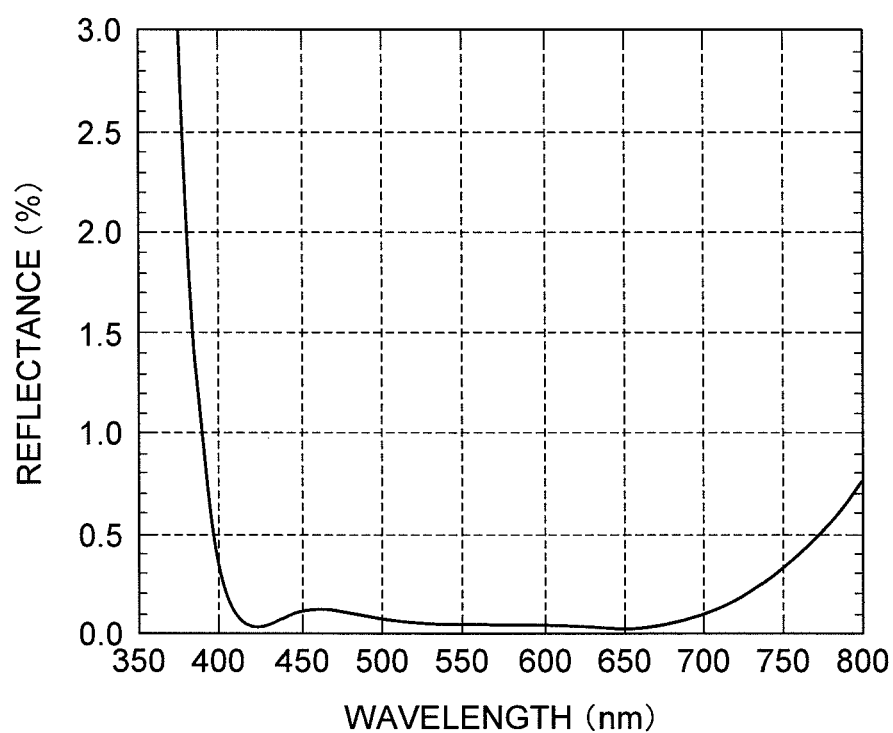
FIG. 22 is a graph showing spectral characteristics of an antireflection coating according to a modified example.

FIG. 22 shows the spectral characteristics when the light beams are incident vertically on the optical member in which the optical film thickness of each of the layers is designed, with the substrate refractive index set to 1.52 and the reference wavelength λ set to 550 nm in Table 6. It is understood from FIG. 22 that the antireflection coating in the modified example can suppress reflectance down to 0.2% or less over the entire range in which the wavelengths of the light beams are 420 nm-720 nm. Note that in Table 6, even the optical member including the antireflection coating, in which each optical film thickness is designed with the reference wavelength λ set to the d-line (wavelength 587.6 nm), has substantially the same spectral characteristics as the spectral characteristics shown in FIG. 22 in a way that affects substantially none of the spectral characteristics thereof.

TABLE 6

| layer | material | n | | thicknesses of layers | |
|---|---|---|---|---|---|
| | medium air | 1 | | | |
| 5 | MgF2 + SiO2 | 1.26 | 0.275λ | | 0.269λ |
| 4 | ZrO2 + TiO2 | 2.12 | 0.045λ | | 0.043λ |
| 3 | Al2O3 | 1.65 | 0.212λ | | 0.217λ |
| 2 | ZrO2 + TiO2 | 2.12 | 0.077λ | | 0.066λ |
| 1 | Al2O3 | 1.65 | 0.288λ | | 0.290λ |
| | n (substrate) | | 1.46 | | 1.52 |

Figure 23:
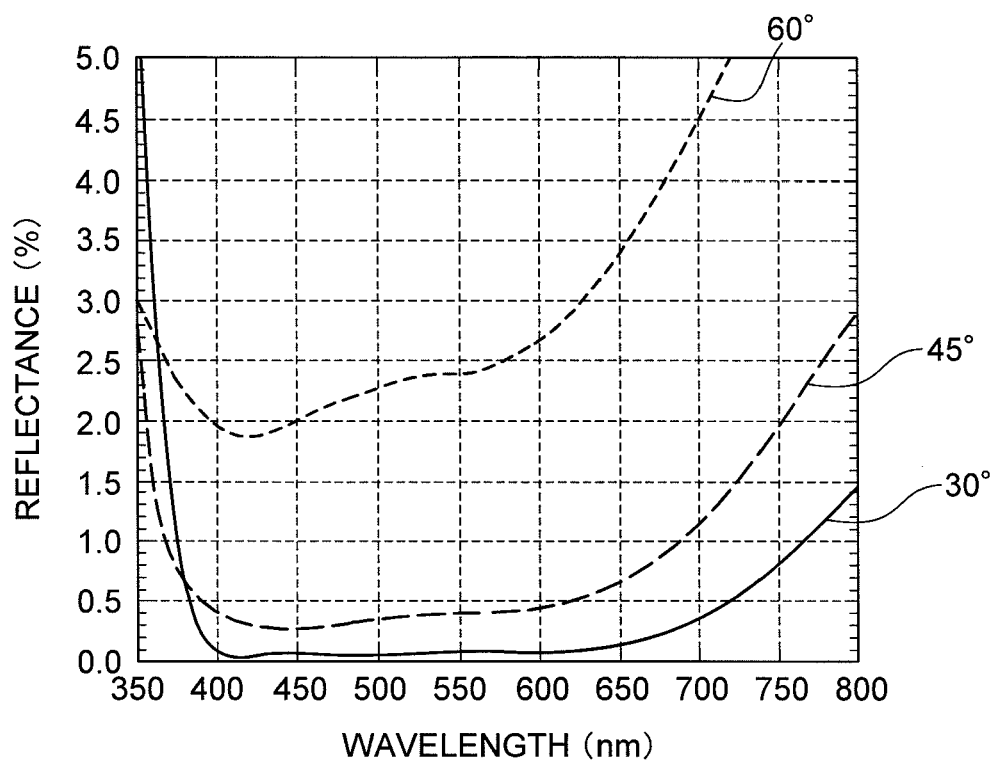
FIG. 23 is a graph showing incident angle dependency of spectral characteristics of the antireflection coating according to the modified example.

FIG. 23 shows the spectral characteristics in such a case that the incident angles of the light beams on the optical member having the spectral characteristics shown in FIG. 22 are 30 degrees, 45 degrees and 60 degrees, respectively. Note that FIGS. 22 and 23 do not illustrate the spectral characteristics of the optical member including the antireflection coating in which the refractive index of the substrate shown in Table 6 is 1.46, however, it is understood that the optical member has substantially the same spectral characteristics such as the refractive index of the substrate being 1.52.

Figure 24:
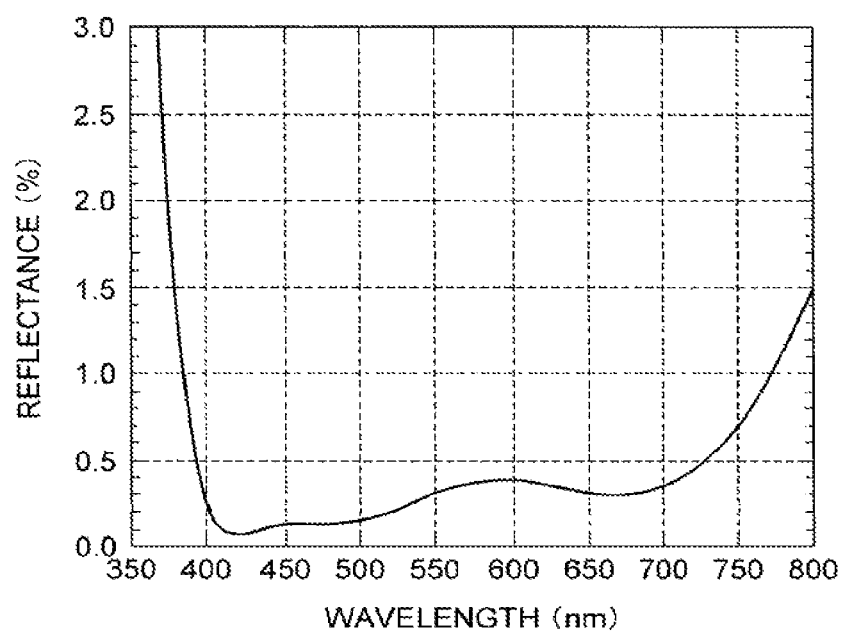
FIG. 24 is a graph showing spectral characteristics of an antireflection coating manufactured by a prior art.

Furthermore, FIG. 24 shows one example of the antireflection coating formed by only the dry process such as a conventional vacuum evaporation method by way of comparison. FIG. 24 shows the spectral characteristics when the light beams are incident vertically on the optical member in which the antireflection coating structured under the conditions shown in the following Table 7 is designed with the refractive index of the substrate set to 1.52 in the same way as in Table 6. Moreover, FIG. 25 shows the spectral characteristics in such a case that the incident angles of the light beams on the optical member having the spectral characteristics shown in FIG. 24 are 30 degrees, 45 degrees and 60 degrees, respectively.

TABLE 7

| layer | material | n | thicknesses of layers |
|---|---|---|---|
| | medium air | 1 | |
| 7 | MgF2 | 1.39 | 0.243λ |
| 6 | ZrO2 + TiO2 | 2.12 | 0.119λ |
| 5 | Al2O3 | 1.65 | 0.057λ |
| 4 | ZrO2 + TiO2 | 2.12 | 0.220λ |
| 3 | Al2O3 | 1.65 | 0.064λ |
| 2 | ZrO2 + TiO2 | 2.12 | 0.057λ |
| 1 | Al2O3 | 1.65 | 0.193λ |
| | refractive index of substrate | | 1.52 |

Figure 25:
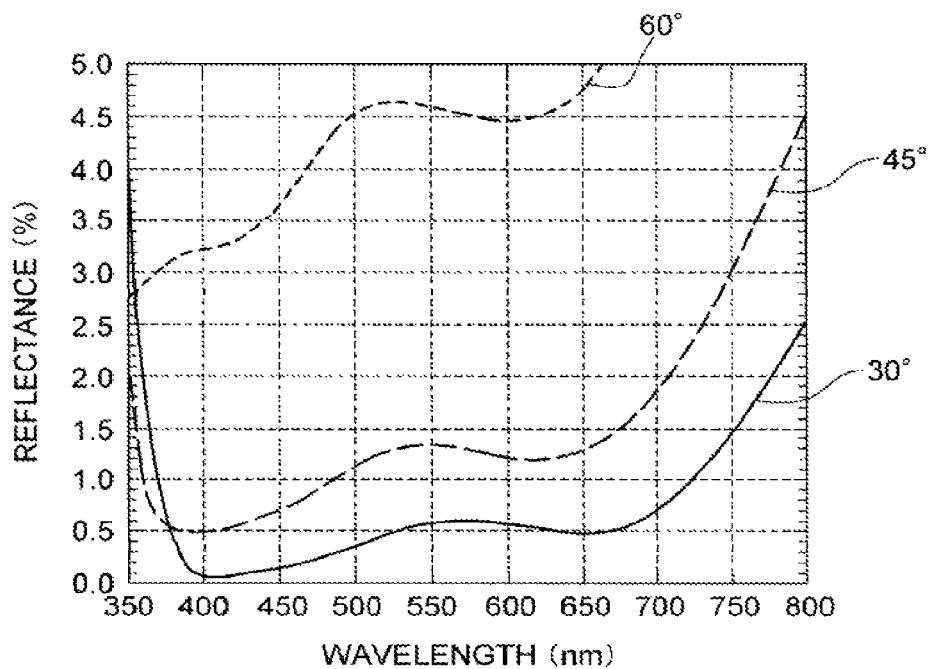
FIG. 25 is a graph showing incident angle dependency of spectral characteristics of the antireflection coating manufactured by the prior art.

To compare the spectral characteristics of the optical member including the antireflection coating according to the present embodiment illustrated in FIGS. 21 through 23 with the spectral characteristics in the conventional examples shown in FIGS. 24 and 25, it is well understood that the present antireflection coating has the much lower reflectance at any incident angles and, besides, has the low reflectance in the broader band.

Then, an example of applying the antireflection coating shown in Tables 5 and 6 to Examples 1 through 4 discussed above is explained.

In the imaging lens according to Example 1, as shown in Table 1, since the refractive index nd of the negative meniscus lens L11 of the first lens group G1 is 1.76690 (nd=1.76690), and the refractive index nd of the double concave negative lens L12 of the first lens group G1 is 1.88300 (nd=1.88300), it is feasible to reduce the reflected light from each lens surface and to reduce ghost images and flare as well by applying the antireflection coating 101 (see Table 5) corresponding to 1.74 as the refractive index of the substrate to the image side lens surface of the negative meniscus lens L11 and applying the antireflection coating (see Table 5) corresponding to 1.85 as the refractive index of the substrate to the object side lens surface of the double concave negative lens L12.

Moreover, in the imaging lens SL2 according to Example 2, as shown in the Table 2, since the refractive index nd of the negative meniscus lens L11 of the first lens group G1 is 1.76690 (nd=1.76690), and the refractive index nd of the double concave negative lens L12 of the first lens group G1 is 1.88300 (nd=1.88300), it is feasible to reduce the reflected light from each lens surface and to reduce ghost images and flare as well by applying the antireflection coating 101 (see Table 5) corresponding to 1.74 as the refractive index of the substrate to the image side lens surface of the negative meniscus lens L11 and applying the antireflection coating (see Table 5) corresponding to 1.85 as the refractive index of the substrate to the image side lens surface of the double concave negative lens L12.

Moreover, in the imaging lens SL3 according to Example 3, as shown in the Table 3, since the refractive index nd of the negative meniscus lens L11 of the first lens group G1 is 1.76690 (nd=1.76690), and the refractive index nd of the double concave negative lens L13 of the first lens group G1 is 1.57965 (nd=1.57965), it is feasible to reduce the reflected light from each lens surface and to reduce ghost images and flare as well by applying the antireflection coating (see Table 5) corresponding to 1.74 as the refractive index of the substrate to the image side lens surface of the negative meniscus lens L11, and applying the antireflection coating (see Table 5) corresponding to 1.62 as the refractive index of the substrate to the object side lens surface of the double concave negative lens L13.

Moreover, in the imaging lens SL4 according to Example 4, as shown in the Table 4, since the refractive index nd of the negative meniscus lens L11 of the first lens group G1 is 1.76690 (nd=1.76690), and the refractive index nd of the double convex positive lens L14 of the first lens group G1 is 1.69870 (nd=1.69870), it is feasible to reduce the reflected light from each lens surface and to reduce ghost images and flare as well by applying the antireflection coating 101 (see Table 5) corresponding to 1.74 as the refractive index of the substrate to the object side lens surface of the negative meniscus lens L11 and applying the antireflection coating 101 (see Table 5) corresponding to 1.74 as the refractive index of the substrate to the object side lens surface of the double convex positive lens L14.

As described above, an imaging lens according to each Example of the present embodiment makes it possible to excellently correct various aberrations in each focal length state from the wide-angle end state to the telephoto end state even upon carrying out vibration correction with reducing ghost images and flare in spite of a large aperture with the f-number of 2.88. Moreover, the present embodiment makes it possible to provide an imaging lens being a super wide-angle, high zoom ratio zoom lens capable of zooming from a super-wide angle of view of 100 degrees or more to a standard angle of view of about 50 degrees, having excellent optical performance with excellently correcting various aberrations upon carrying out vibration reduction.

What is claimed is:

1. An imaging lens comprising:
   a front lens group having negative refractive power disposed to a most object side; and
   a rear lens group having negative refractive power, disposed to an image side of the front lens group, and having at least a portion thereof movable in a direction including a component substantially perpendicular to an optical axis,
   the rear lens group including a first negative lens component, a second negative lens component, and a positive lens component,
   the second negative lens component being disposed between the first negative lens component and the positive lens component, and being separated from the first negative lens component and the positive lens component by air spaces,
   the second negative lens component side lens surface of the first negative lens component being a concave surface facing the second negative lens component,
   the second negative lens component being a negative meniscus lens shape having a concave surface facing the first negative lens component, and
   at least one lens surface among optical surfaces of the first negative lens component, the second negative lens component and the positive lens component being an aspherical surface.

2. The imaging lens according to claim 1, wherein an aperture stop is included in a vicinity of the rear lens group, and the rear lens group has disposed, in order from the aperture stop, the first negative lens component, the second negative lens component and the positive lens component.

3. The imaging lens according to claim 1, wherein the positive lens component has a double convex shape.

4. The imaging lens according to claim 1, wherein at least one of the first negative lens component, the second negative lens component and the positive lens component is a cemented lens constructed by a negative lens cemented with a positive lens.

5. The imaging lens according to claim 4, wherein a cemented surface of the cemented lens is a concave surface facing an aperture stop.

6. The imaging lens according to claim 1, further comprising:
   a second lens group having positive refractive power disposed between the front lens group, which is a first lens group, and the rear lens group, which is a third lens group; and
   a fourth lens group having positive refractive power disposed to an image side of the third lens group, and
   upon zooming from a wide-angle end state to a telephoto end state, a distance between the first lens group and the second lens group varies, a distance between the second lens group and the third lens group varies, and a distance between the third lens group and the fourth lens group varies.

7. The imaging lens according to claim 6, wherein upon zooming from the wide-angle end state to the telephoto end state, the distance between the first lens group and the second lens group decreases, the distance between the second lens group and the third lens group increases, and the distance between the third lens group and the fourth lens group decreases.

8. An optical apparatus equipped with the imaging lens for forming an image of an object on a given image plane according to claim 1.

9. The imaging lens according to claim 1, wherein an aperture stop is disposed to an image side of the front lens group.

10. The imaging lens according to claim 1, wherein the rear lens group includes an aperture stop.

11. The imaging lens according to claim 1, wherein upon zooming from a wide-angle end state to a telephoto end state, the front lens group is moved along the optical axis.

12. The imaging lens according to claim 1, further comprising an image side lens group having positive refractive power disposed to an image side of the rear lens group.

13. A method for manufacturing an imaging lens including a front lens group having negative refractive power and a rear lens group having negative refractive power, the method comprising steps of:
   disposing the front lens group to a most object side;
   disposing the rear lens group to an image side of the front lens group;
   the rear lens group including a first negative lens component, a second negative lens component and a positive lens component such that the second negative lens component is disposed between the first negative lens component and the positive lens component, the second negative lens component is separated from the first negative lens component and the positive lens component by air spaces, the second negative lens component being a negative meniscus lens shape having a concave surface facing the first negative lens component, and a shape of an air lens formed by the first negative lens component and the second negative lens component is a double convex shape;
   at least one lens surface among optical surfaces of the first negative lens component, the second negative lens component and the positive lens component being an aspherical surface; and
   disposing at least a portion of the rear lens group movably in a direction including a component substantially perpendicular to an optical axis.

* * * * *